(12) United States Patent
Miller et al.

(10) Patent No.: US 9,217,058 B2
(45) Date of Patent: Dec. 22, 2015

(54) ACETAL METATHESIS POLYMERIZATION

(71) Applicant: UNVERSITY OF FLORIDA RESEARCH FOUNDATION, INC., Gainesville, FL (US)

(72) Inventors: Stephen A. Miller, Gainesville, FL (US); Alexander G. Pemba, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 78 days.

(21) Appl. No.: 14/034,839

(22) Filed: Sep. 24, 2013

(65) Prior Publication Data

US 2014/0024801 A1  Jan. 23, 2014

Related U.S. Application Data

(63) Continuation-in-part of application No. PCT/US2012/029355, filed on Mar. 16, 2012.

(60) Provisional application No. 61/467,004, filed on Mar. 24, 2011.

(51) Int. Cl.
| | |
|---|---|
| *C08G 65/34* | (2006.01) |
| *C08G 65/00* | (2006.01) |
| *C08G 2/06* | (2006.01) |
| *C08G 2/18* | (2006.01) |
| *C08G 4/00* | (2006.01) |
| *C08L 59/04* | (2006.01) |

(52) U.S. Cl.
CPC  *C08G 65/00* (2013.01); *C08G 2/06* (2013.01); *C08G 2/18* (2013.01); *C08G 4/00* (2013.01); *C08L 59/04* (2013.01)

(58) Field of Classification Search
CPC ................................ C08G 65/00; C08G 65/34
USPC ......................................................... 528/425
See application file for complete search history.

(56) References Cited

U.S. PATENT DOCUMENTS

| | | | |
|---|---|---|---|
| 3,931,337 | A | 1/1976 | Langdon |
| 4,105,637 | A | 8/1978 | Semanchik et al. |
| 4,189,609 | A | 2/1980 | Langdon |
| 4,377,667 | A | 3/1983 | Sakurai et al. |
| 4,399,272 | A | 8/1983 | Sakurai et al. |
| 4,540,773 | A | 9/1985 | Komazawa et al. |
| 5,206,443 | A | 4/1993 | Baur et al. |
| 5,587,449 | A | 12/1996 | Fleischer et al. |
| 5,726,276 | A | 3/1998 | Nakai et al. |
| 5,728,798 | A | 3/1998 | Nakai et al. |

(Continued)

OTHER PUBLICATIONS

Narasimhan, S. et al., "A Simple Alkene-Catalyzed Reduction of Aromatic Esters to Alcohols by Zinc Borohydride," *Synthetic Communications*, 1997, pp. 385-390, vol. 27, No. 3.

*Primary Examiner* — Duc Truong
(74) *Attorney, Agent, or Firm* — Saliwanchik, Lloyd & Eisenschenk

(57) ABSTRACT

A method of preparing a polyacetal comprising polymerization of a mixture comprising a plurality of at least one bis-acetal monomer in the presence of an acid catalyst that promotes the metathesis of the acetal units. The bis-acetal can be formed from an acid catalyzed exchange between a mono-acetal monomer with a diol. The formation of the bis-acetal and the polyacetal can be carried out simultaneously. The diol can be isolated from a biorenewable source and the ultimate polyacetal is a degradable or biodegradable polymer.

13 Claims, 23 Drawing Sheets

(56) References Cited

U.S. PATENT DOCUMENTS

| | | |
|---|---|---|
| 5,844,059 A | 12/1998 | Yamamoto et al. |
| 5,866,670 A | 2/1999 | Nakai et al. |
| 5,886,139 A | 3/1999 | Yamamoto et al. |
| 5,958,398 A | 9/1999 | Papisov |
| 5,962,623 A | 10/1999 | Eckardt et al. |
| 6,037,439 A | 3/2000 | Serizawa et al. |
| 7,001,959 B2 | 2/2006 | Mück et al. |
| 7,220,414 B2 | 5/2007 | Brocchini et al. |
| 7,501,479 B2 | 3/2009 | Ionescu et al. |
| 7,745,548 B2 | 6/2010 | Zierer et al. |

ACETAL METATHESIS POLYMERIZATION

CROSS-REFERENCE TO RELATED APPLICATIONS

This application is a continuation-in-part of International Patent Application No. PCT/US2012/029355, filed Mar. 16, 2012, which claims the benefit of U.S. Provisional Patent Application Ser. No. 61/467,004, filed Mar. 24, 2011, the disclosures of which are hereby incorporated by reference in their entirety.

The subject invention was made with government support under Contract No. CHE-0848236 awarded by the National Science Foundation. The government has certain rights to this invention.

BACKGROUND OF INVENTION

The next generation of environmentally friendly commodity plastics is being developed based on two essential design strategies. First, the polymers are derived from sustainable feedstocks based on biomass. Second, the polymers are readily degradable in the environment on a timescale measured in months or years.

Poly(lactic acid) (PLA) currently stands as the most commercially successful biorenewable synthetic thermoplastic. The persistence of this aliphatic polyester in a landfill, however, can rival that of traditional petroleum-based thermoplastics. The indiscriminate esterases generally responsible for ester hydrolysis are sparse in a landfill and, thus, PLA degradation is optimal only in the biotic, warm, and oxygen-rich conditions of compost. One route to alleviating this detriment is through the incorporation of the acetal functional group (e.g., —OCH$_2$O—) into the main-chain of polymeric architectures. Like biomass, this functional group is oxygen-rich and the central carbon's oxidation state (O) matches the average oxidation state of photosynthetic building blocks (e.g., glucose, C$_6$H$_{12}$O$_6$). Moreover, nature uses this functional group to connect the glucose units of earth's most abundant polymer, cellulose. Important to polymer chain scission, the acetal functional group is readily hydrolyzed under acidic aqueous conditions. Thus, degradation is congruous with the conditions of a landfill, where surface bacteria and fungi expel acidic metabolites that percolate via rainfall to the lower, abiotic, anoxic (low oxygen) regions, which display a lower pH.

Ring-Opening Polymerization (ROP) is a widely employed technique for the conversion of cyclic monomers to linear polymers. Large cyclic acetals that are amenable to ROP, however, are generally not feasible for large-scale and efficient production. Hence, a general and effective method for the production of polyacetals by an acetal metathesis reaction is desirable.

BRIEF SUMMARY

Embodiments of the invention are directed to a method of preparing a polyacetal comprising the steps of: providing a polymerization mixture comprising a plurality of at least one bis-acetal monomer of the structure:

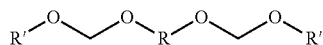

wherein R' is independently C$_1$ to C$_5$ alkyl; R is one or more of: C$_1$ to C$_{24}$ alkylene; C$_2$ to C$_{24}$ alkenylene; C$_6$ to C$_{14}$ arylene; C$_7$ to C$_{24}$ alkylarylene; heteroatom or carbonyl interrupted C$_1$ to C$_{24}$ alkylene; heteroatom or carbonyl interrupted C$_2$ to C$_{24}$ alkenylene; heteroatom or carbonyl interrupted C$_4$ to C$_{14}$ arylene; and/or heteroatom or carbonyl interrupted C$_5$ to C$_{24}$ alkylarylene; and polymerizing the monomers upon addition of a catalyst to the polymerization mixture to form the polyacetals of the structure:

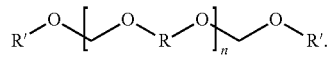

The polymer can be a copolymer of two or more acetal repeating units, or can be of one or more acetal repeating units with other repeating units. The polyacetals can be environmentally degradable, for example, degradable by landfill conditions. The polyacetals can be thermoplastics.

The bis-acetal can further be provided in situ through alkoxymethylation of a diol of the structure:

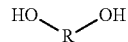

wherein R is C$_1$ to C$_{24}$ alkylene, C$_2$ to C$_{24}$ alkenylene, C$_6$ to C$_{14}$ arylene, C$_7$ to C$_{24}$ alkylarylene, heteroatom interrupted C$_1$ to C$_{24}$ alkylene, heteroatom interrupted C$_2$ to C$_{24}$ alkenylene, heteroatom interrupted C$_4$ to C$_{14}$ arylene, or heteroatom interrupted C$_5$ to C$_{24}$ alkylarylene, said diol being alkoxymethylated with an acetal of the structure:

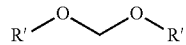

wherein R' is independently C$_1$ to C$_5$ alkyl. Such an alkoxymethylation can be catalyzed, for example, with an acid catalyst such as triflic acid.

DETAILED DISCLOSURE

Embodiments of the invention are directed to a novel method of making polymers with acetal repeating units, a polyacetal. The repeating units contain an acetal (—OCH$_2$O—) functionality. In some embodiments of the invention, the polyacetals are thermoplastics and are degradable under landfill or other conditions. The acetal repeating unit can be present in a copolymer, where the copolymer can be a random copolymer of different acetal repeating units or copolymers of acetal repeating units with other repeating units. For example, the copolymer can contain acetal and ester functionalities that define repeating units. In similar fashion, other functionalities, including, but not exclusive to, amides, ethers, and alkenes could be included as would be apparent to those skilled in the art. The copolymers can be random copolymers or block copolymers depending upon the monomers used and the manner in which the copolymers are formed.

In embodiments of the invention, a polyacetal is prepared by providing a polymerization mixture comprising a plurality of at least one bis-acetal monomer of the structure:

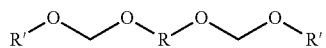

wherein R' is independently C$_1$ to C$_5$ alkyl; R is C$_4$ to C$_{24}$ alkylene, C$_4$ to C$_{24}$ alkenylene, C$_6$ to C$_{14}$ arylene, C$_7$ to C$_{24}$ alkylarylene, heteroatom or carbonyl interrupted C$_4$ to C$_{24}$ alkylene where the heteroatom is O or S, heteroatom or carbonyl interrupted C$_4$ to C$_{24}$ alkenylene where the heteroatom is O or S, heteroatom or carbonyl interrupted C$_4$ to C$_{14}$ arylene where the heteroatom is O or S, and/or heteroatom or carbonyl interrupted C$_5$ to C$_{24}$ alkylarylene where the heteroatom is O or S; and polymerizing the monomers upon addition of a catalyst to the polymerization mixture to yield a homopolymer or copolymer of the structure:

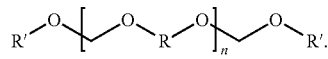

Figure 1:
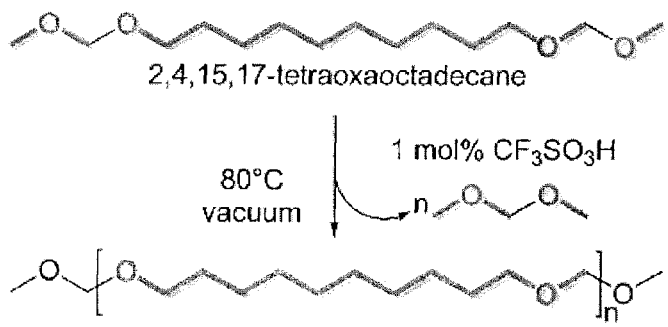
FIG. 1 shows a reaction scheme of acetal metathesis polymerization according to an embodiment of the invention.

The R' and R unit can be linear, branched, cyclic, polycyclic or any combination thereof with the provision that the site of attachment of the oxygen atom is not predisposed toward cyclization upon exposure to a transacetalization catalyst. For example, a linear alkylene has at least four carbons separating the oxygen atoms. For example, a cyclic alkylene can have the point of attachment on adjacent carbons if the cyclic can not assume a conformation that promotes formation of a 5-membered cyclic acetal. For example a C$_6$ arylene can have oxygen substituents in the 1,3- or 1,4- positions but not the 1,2-positions. Those skilled in the art can appreciate when a bias toward cyclization is inherent in the R unit. The R unit can be substituted with a halogen, substituted or unsubstituted alkyl, substituted or unsubstituted alkenyl, substituted or unsubstituted alkynyl, substituted or unsubstituted aryl, substituted or unsubstituted amide, substituted or unsubstituted alkoxy, substituted or unsubstituted aryloxy, substituted or unsubstituted ether, substituted or unsubstituted ester, substituted or unsubstituted carbonate, substituted or unsubstituted anhydride, substituted or unsubstituted nitrile, substituted or unsubstituted amine, substituted or unsubstituted urea, substituted or unsubstituted urethane, or any other functional group or combination of functional groups that are unreactive under the acetal metathesis reaction conditions. In this manner an environmentally degradable thermoplastic is prepared according to an embodiment of the invention. The polymerization is illustrated in FIG. 1 for an embodiment of the invention where the bis-acetal monomer is 2,4,15,17-tetraoxooctadecane.

The polyacetals can be homopolymers or copolymers. The copolymers can be of two or more acetal repeating units, or can be of one or more acetal repeating units with other repeating units. The copolymers can be random copolymers or block copolymers depending upon the monomers used and the manner in which the copolymers are formed. For example, in an embodiment of the invention, an oligomer or polymer is prepared having repeating units linked through a functionality other than an acetal unit; the oligomer or polymer can be terminated with an acetal unit and subsequently incorporated into the AMP mixture for incorporation into the polyacetal to form a random copolymer or block copolymer depending upon the proportions of the bis-acetal monomers or polymers included in the AMP mixture. In another embodiment of the invention, AMP is carried out with the bis-acetal monomers and an end-capping monomer that has a functionality that can subsequently be polymerized by a second step-growth condensation or step-growth addition polymerization with its complementary monomers or polymers to form a random or block copolymer, depending upon the proportions of the bis-acetal monomers, the end-capping monomers and its complementary monomers. In other embodiments of the invention, monomers that form a second functionality upon polymerization can be included with the bis-acetal monomers and a monomer containing a precursor to a second functionality and an acetal functionality to form a random or block copolymer upon polymerization, according to an embodiment of the invention.

In an embodiment of the invention, the bis-acetal monomers are polymerized with an end-capping monomer having acetal functionality and a second functionality that can undergo a chain-growth addition polymerization, for example, an acrylate, methacrylate, styrene functionality, a cyclic ester, a cyclic amide, or a cyclic alkene. In this manner the second functionality can be used to form a branched, hyper-branched, or network polymer upon polymerization of the second monomer. In another embodiment of the polymerization, a cyclic acetal can be copolymerized with the bis-acetal monomers to form a copolymer where the sizes of the sequences having a single repeating unit depend upon the relative rates of AMP and ring-opening. In another embodiment of the invention, a branched tris-, tetrakis- or higher functionalized acetal monomer can be used or included with one or more bis-acetal monomers such that a branched or network polymer can be formed depending upon the proportions and the extent of polymerization that is carried out, as can be appreciated by one skilled in the art.

Figure 2:
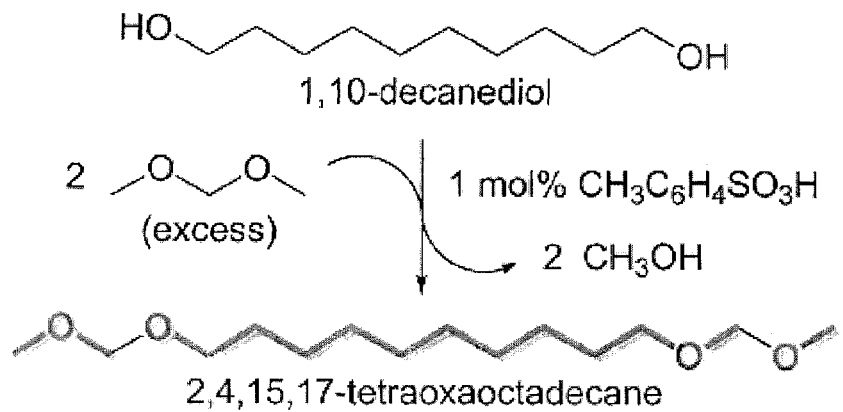
FIG. 2 shows a reaction scheme for the formation of a bis-acetal monomer for the preparation of a polyacetal according to an embodiment of the invention.

Bis-acetal monomers can be prepared by any method, for example the reaction between a diol and an alkoxymethyl halide such as methoxymethyl chloride. In one embodiment of the invention, bis-acetal monomers are prepared in the polymerization vessel by providing a diol of the structure:

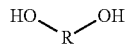

wherein R is $C_4$ to $C_{24}$ alkylene, $C_4$ to $C_{24}$ alkenylene, $C_6$ to $C_{14}$ arylene, $C_7$ to $C_{24}$ alkylarylene, heteroatom or carbonyl interrupted $C_3$ to $C_{24}$ alkylene, heteroatom interrupted $C_4$ to $C_{24}$ alkenylene, heteroatom or carbonyl interrupted $C_4$ to $C_{14}$ arylene, or heteroatom or carbonyl interrupted $C_5$ to $C_{24}$ alkylarylene where the R unit is linear, branched, cyclic, polycyclic or any combination thereof; and alkoxymethylating the diol with a mono-acetal monomer of the structure:

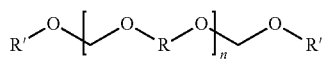

wherein R' is independently $C_1$ to $C_5$ alkyl. The formation of the monomer can be carried out by the addition of a transacetalization catalyst under conditions where acetal formation does not compete with AMP polymerization of the resulting bis-acetal monomer. For example, a protic acid, such as sulfuric acid or toluenesulfonic acid, or a Lewis acid, such as boron trifluoride, can be used as the catalyst for acetal formation. In an embodiment of the invention, the catalyst can be a resin bound acid that can be readily removed by filtration after the transacetalization or can be employed in a continuous process. As required, an excess of the mono-acetal monomer can be used with the bis-alcohol employed as a limiting reagent such that oligomer formation is statistically suppressed. For example, the mono-acetal can be used in a 5, 10, 20 fold or higher molar excess to that of the diol to optimize the proportion of bis-acetal monomer. The preparation of the bis-acetal monomer is illustrated in FIG. 2 for the formation of 2,4,15,17-tetraoxotetradecane from 1,10-decane diol.

In embodiments of the invention, the diol is available by isolation from natural sources, such as 1,10-decane diol from castor beans. When the diols are prepared from natural sources, the polyacetals are biorenewable as well as degradable or biodegradable polymers. In other embodiments of the invention, triols, tetrols and even higher polyols can be converted into tris- tetrakis-, or higher polyacetal monomers to allow the formation of cross-linked resins with or without bis-acetal monomers.

Bis-acetal formation can be carried out in solution, and at temperatures where the mono-acetal refluxes or higher. The solvent is inert to the catalyst and is chosen to allow a chosen reaction temperature and be readily separated from the product bis-acetal upon completion of the reaction.

Figure 3:
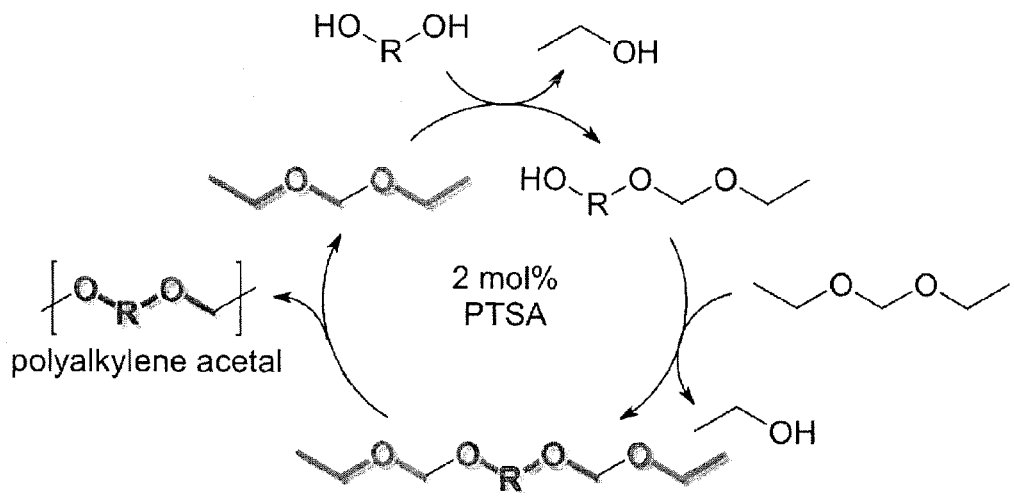
FIG. 3 shows a reaction scheme for the formation of a polyacetal from a diol and a mono-acetal monomer without isolation of a bis-acetal according to an embodiment of the invention.

According to an embodiment of the invention, the bis-acetal formation can be carried out simultaneously with polymerization of the bis-acetal as shown in FIG. 3, where the polymer is formed without the isolation of any intermediate bis-acetals. As the volatile mono-acetal monomer can be used in excess, and can be reintroduced during the polymerization, maintaining a stoichiometric balance of mono-acetal to diol is not required to achieve high molecular weight poly acetals according to an embodiment of the invention. Upon complete loss of the alcohol functionality in the reaction mixture, as can be easily determined by IR spectroscopy or other analytical methods, the molecular weight can be increased or decreased by removal or addition of mono-acetal monomer, respectively.

Depending upon the specific polymerization conditions employed, the degree of polymerization can vary. In general, homopolymers of a single acetal repeating unit or copolymers with a plurality of different acetal repeating units, as defined above, have degree of polymerization that is in excess of about 20, for example, 50, 100, 500, 1,000, 5,000, 10,000, 20,000, 50,000, 100,000 or more. As is appreciated by one skilled in the art, a sufficient degree of polymerization is one where desired material properties are achieved, for example, a degree of polymerization that allows the polyacetal to be used in place of common petroleum-based thermoplastics for specific applications yet allows processing techniques, such as extrusion, injection molding, blow molding or fiber spinning, as needed for fabrication of a physical structure constructed from the acetal.

The acetal repeating units can be in random copolymers or block copolymers and can be in polymers of any architecture including branched, comb, star, and dendritic polymers and copolymers by employing the appropriate combination of monomers and comonomers. The molecular weight distribution of a homopolymer prepared by AMP is generally normal but can be more narrow or broader, depending upon the specific monomers and conditions employed for their preparation.

The polymerizations commence upon the inclusion of a catalyst, for example: Lewis acids, such as halides of boron, tin, titanium, phosphorus, arsenic or antimony, including boron trifluoride, tin tetrachloride, titanium tetrachloride, phosphorus pentachloride, phosphorus pentafluoride, arsenic pentafluoride and antimony pentafluoride and complexes and salts of Lewis acids; proton acids such as sulfuric acid, benzenesulfonic acid, toluenesulfonic acid, perchloric acid and trifluoromethanesulfonic acid (triflic acid); esters of proton acids, particularly, esters of perchloric acid with lower aliphatic alcohols, such as t-butyl perchlorate; anhydrides of proton acids, particularly, mixed anhydrides of perchloric acid with lower aliphatic carboxylic acids such as acetyl perchlorate; trimethyloxonium hexafluorophosphate, triphenylmethyl hexafluoroarsenate, acetyl tetrafluoroborate, acetyl hexafluorophosphate and acetyl hexafluoroarsenate; or other strong Lewis or protic acids. The acids can be part of an acid resin, for example a sulfonated polystyrene resin.

Polymerization of the bis-acetal monomers can be carried out with or without solvent in the polymerization mixture. Depending upon the nature of R, different solvents are possible. In general the solvents include hydrocarbons, aromatics, and ethers. Monomer concentration, catalyst concentration, polymerization temperature and polymerization time can be adjusted as needed to achieve the formation of polyacetals.

Following polymerization, the polyacetal can be isolated in a sufficiently pure form for use as a structural material. Although in some embodiments the polymers can be used as formed, for other embodiments isolation can be carried out by any known methods including extraction, precipitation, devolatilization, and freeze drying. Appropriate methods and conditions depend on the polymer structure formed and the monomers and solvents used and are apparent to those skilled in the art.

Methods and Materials

Diol Purification 1,5-Pentanediol was purchased from Acros Organics as a liquid of 98% purity. The diol was purified by stirring over calcium hydride for 24 hours followed by vacuum distillation. The purified diol was stored over molecular sieves.

1,6-Hexanediol was purchased from Acros Organics as a crystalline solid of 97% purity. The diol was purified by recrystallization from ethyl acetate.

1,7-Heptanediol was purchased from Aldrich as a liquid of 95% purity. The diol was purified by stirring over calcium hydride for 24 hours followed by vacuum distillation. The purified diol was stored over molecular sieves.

1,8-Octanediol was purchased from Acros Organics as a crystalline solid of 99% purity. The diol was purified by recrystallization from ethyl acetate.

1,9-Nonanediol was purchased from Acros Organics as a crystalline solid of 99% purity. The diol was purified by recrystallization from ethyl acetate.

1,10-Decanediol was purchased from Acros Organics as a crystalline solid of 99% purity. The diol was purified by recrystallization from 1,2-dichloroethane.

1,12-Dodecanediol was purchased from Aldrich as a crystalline solid in 99% purity. The diol was purified by recrystallization from 1,2-dichloroethane.

1,11- Undecanediol Preparation 1,11-Undecanediol was prepared by a reduction-hydroboration reaction of methyl 10-undecenoate as taught in Narasimhan et al.,*Synthetic Commun.* 1997, 27, 385-90. The diol was purified by recrystallization from 1,2-dichloroethane. Methyl 10-undecenoate was purchased from Aldrich and used as received. $^1$H NMR (DMSO-$d_6$): δ ppm 1.24 (s, 14 H), 1.39 (m, 4 H), 3.37 (m, 4 H), 4.31 (br. s., 2 H); $^{13}$C NMR (DMSO-$d_6$): δ 25.51, 28.97, 29.01, 29.12, 32.55, 60.71.

3,5,16,18-Tetraoxaicosane (decanediol bis-ethylacetal) Preparation

A 1 liter round-bottom flask was charged with 17.43g (0.1 mol, 1 eq.) of 1,10-decanediol, 208.30g (2 mol, 20 eq.) of diethoxymethane, 0.190 g (1 mol %) of para-toluenesulfonic acid, and 100 mL of toluene. A distillation head was added to the flask and the mixture was heated for 24 hours with the distillation of the ethanol. When no ethanol was being collected, the distillation head was replaced by a reflux condenser and the mixture was then refluxed for 48 hours. After cooling, the reaction was quenched with 3 mL of triethylamine. Toluene and excess diethoxymethane were removed using a rotary-evaporator followed by evacuating the mixture with dynamic vacuum using a Schlenk line for 24 hours. The resulting liquid product was passed through a column of basic alumina to yield a colorless oil in 72% yield. $^1$H NMR (CDCl$_3$): δ ppm 1.17 (m, 6 H), 1.29 (m, 12 H), 1.54 (m, 4 H), 3.48 (t, J=6.74 Hz, 4 H), 3.55 (q, J=7.04 Hz, 4 H), 4.62 (m, 4 H); $^{13}$C NMR (CDCl$_3$): δ ppm 15.07, 26.11, 29.33, 29.43, 29.66, 62.93, 67.72, 94.94.

Polyacetal Preparation in Xylenes

Figure 5:
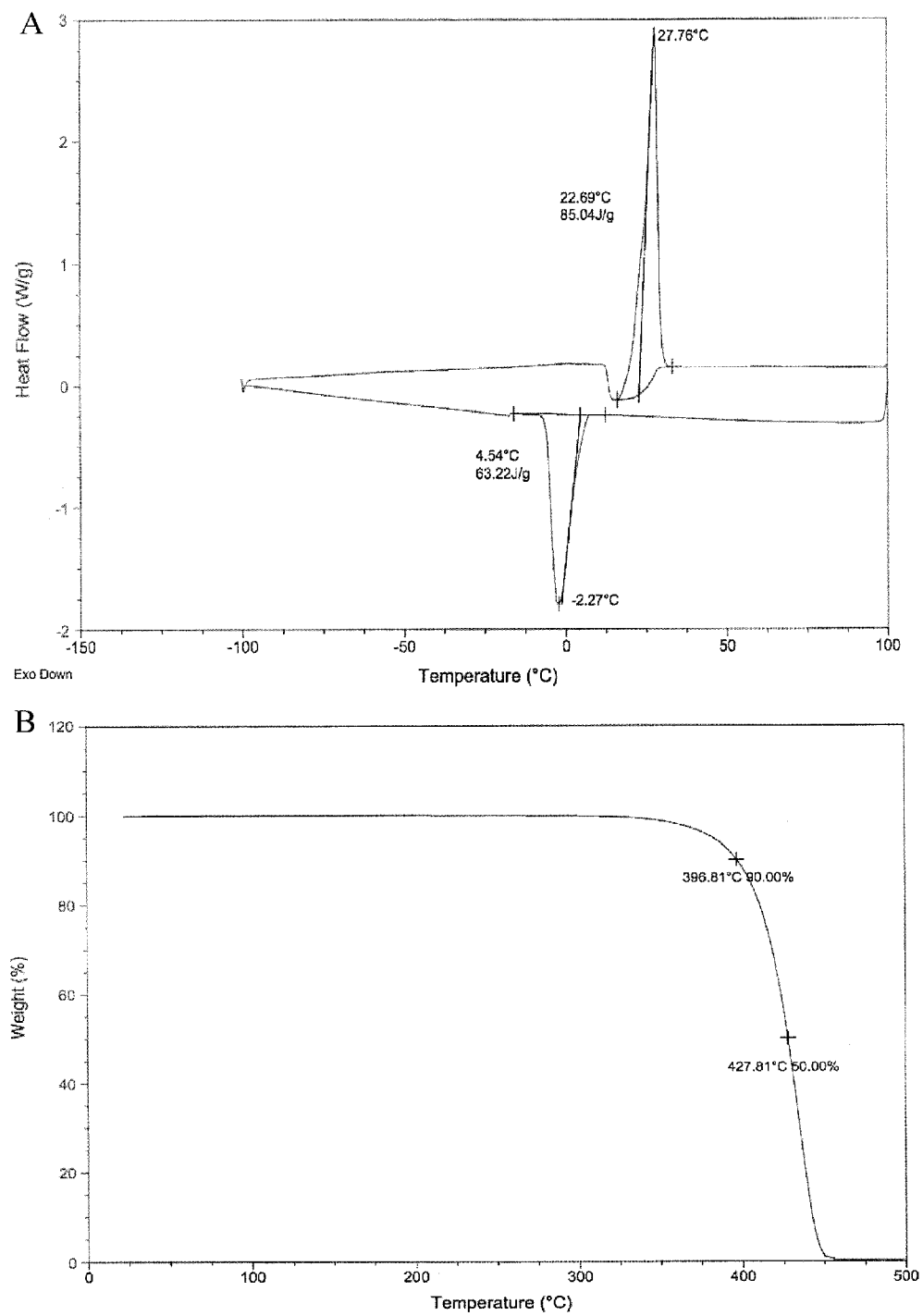
FIG. 5 shows a) differential scanning calorimetry (DSC) and b) thermal gravimetric analysis (TGA) plots for polypentylene acetal according to an embodiment of the invention.
Figure 14:
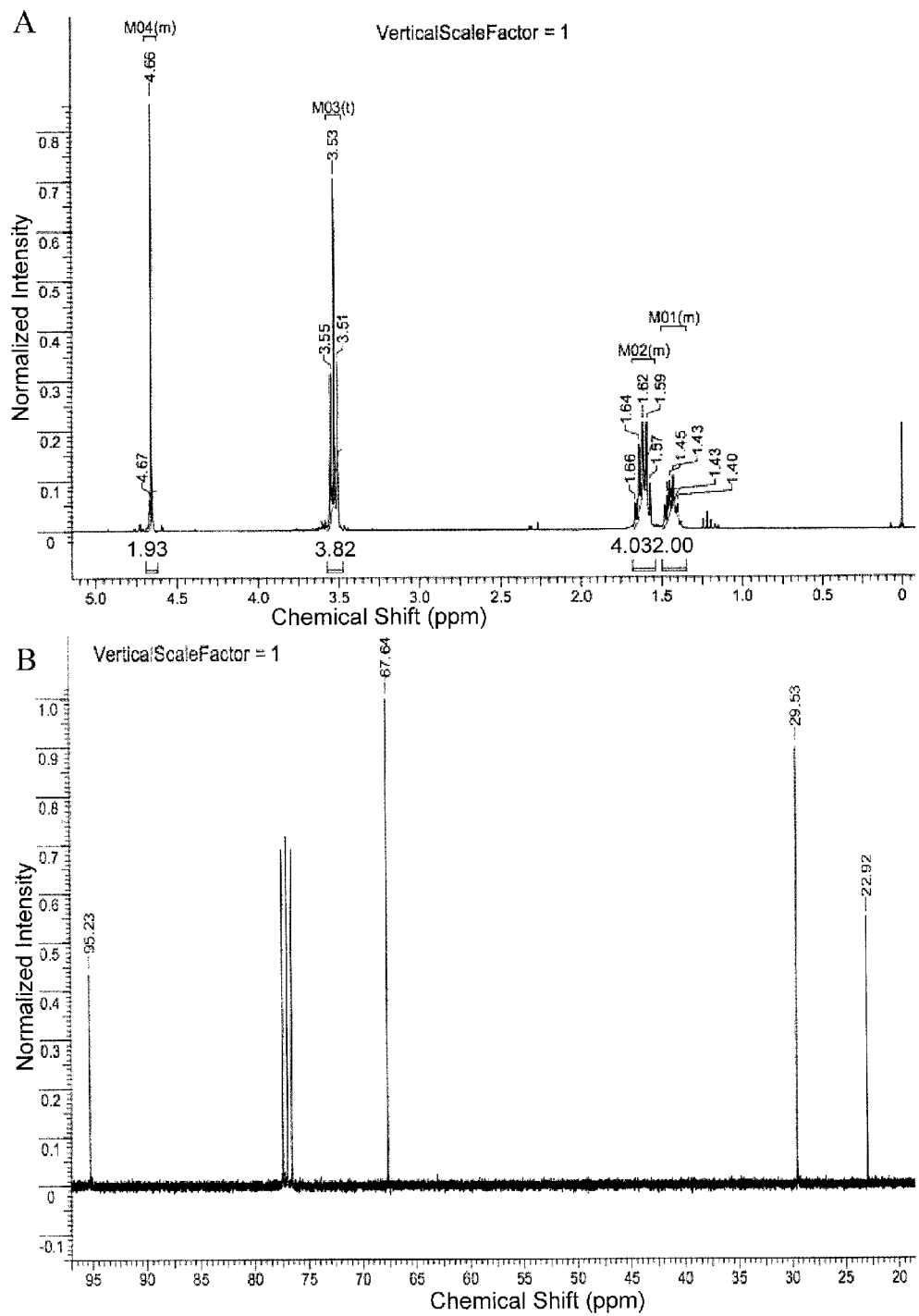
FIG. 14 shows a) $^1$H NMR and b) $^{13}$C spectra for polypentylene acetal according to an embodiment of the invention.

Polypentylene acetal (Table 1, Entry 1) A 100 mL round bottom flask was charged with 1.04 g (10 mmol) of 1,5-pentanediol, 38 mg (2 mol %) of para-toluenesulfonic acid (PTSA) , 15 mL of xylenes, and 37.55 mL (300 mmol) of diethoxymethane. The mixture was stirred under a nitrogen atmosphere for 1 hour at 80° C. The temperature was raised to 115° C. and stirring continued for 2 hours. The temperature was raised to 135° C. and stirred for an additional 2 hours. The temperature was raised to 200° C. for an hour and cooled to 135° C. The flask was placed under dynamic vacuum to remove volatile components. The reaction flask was held under vacuum for 1 hour. Upon cooling, the product mixture was dissolved in a minimal amount of methylene chloride and 1 mL of aqueous 1M NaOH solution was added to the mixture to quench acid. The polyacetal was precipitated by adding the methylene chloride solution to 300 mL of cold methanol. The precipitate was filtered and washed with copious amounts of methanol, acetone, and ether. The precipitated polymer was dried under vacuum overnight to yield a white powder in 48% yield. $^1$H NMR (CDCl$_3$): δ ppm 1.44 (m, 2 H), 1.62 (m, 4 H), 3.53 (t, J=1.00 Hz, 4 H), 4.66 (m, 2 H); $^{13}$C NMR (CDCl$_3$) δ ppm 22.92, 29.53, 67.64, 95.23 FIG. 5 shows the DSC and TGA plots for the polymer, and FIG. 14 shows the $^1$H and $^{13}$C NMR spectra for the polymer.

Figure 6:
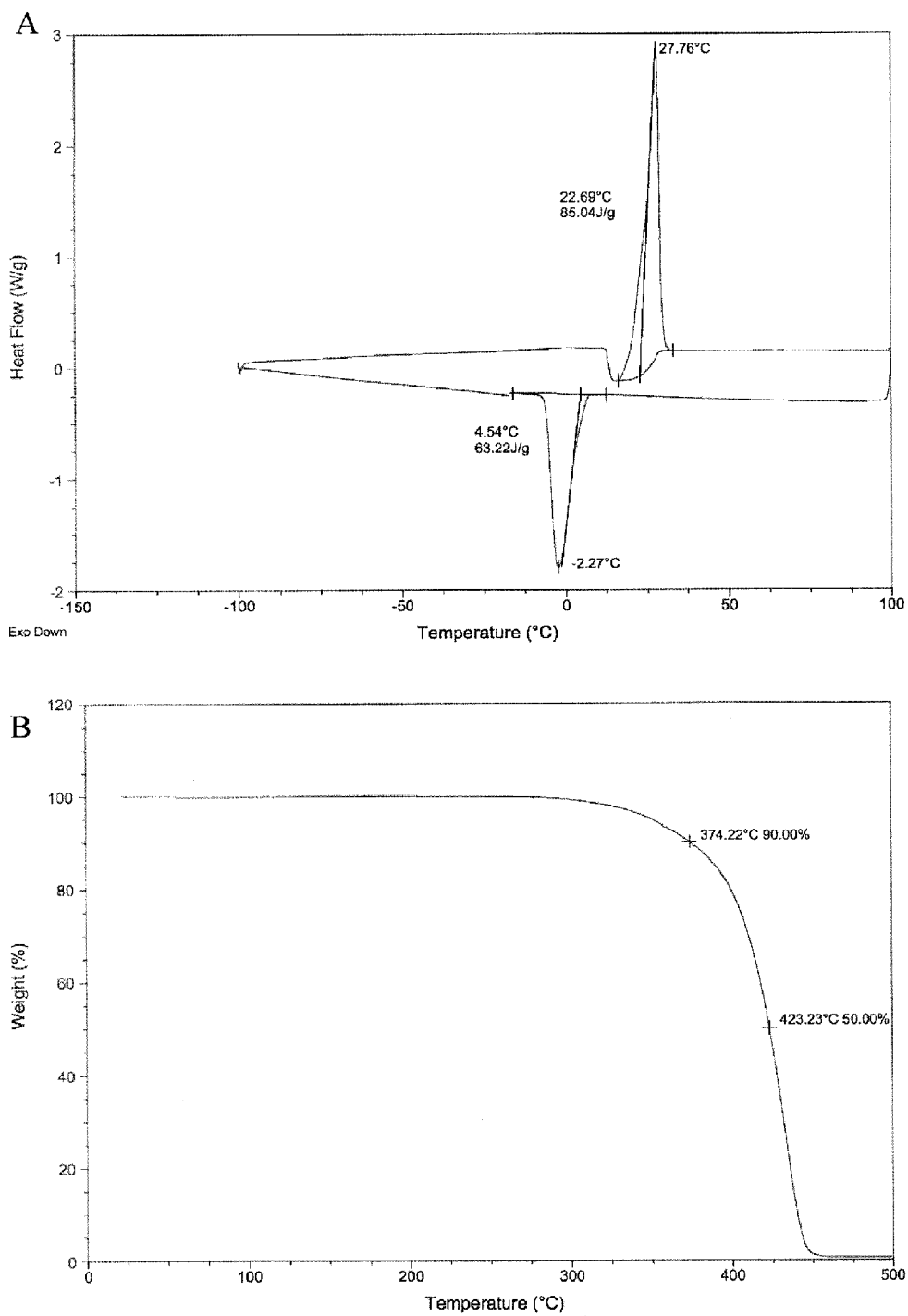
FIG. 6 shows a) DSC and b) TGA plots for polyhexylene acetal according to an embodiment of the invention.
Figure 15:
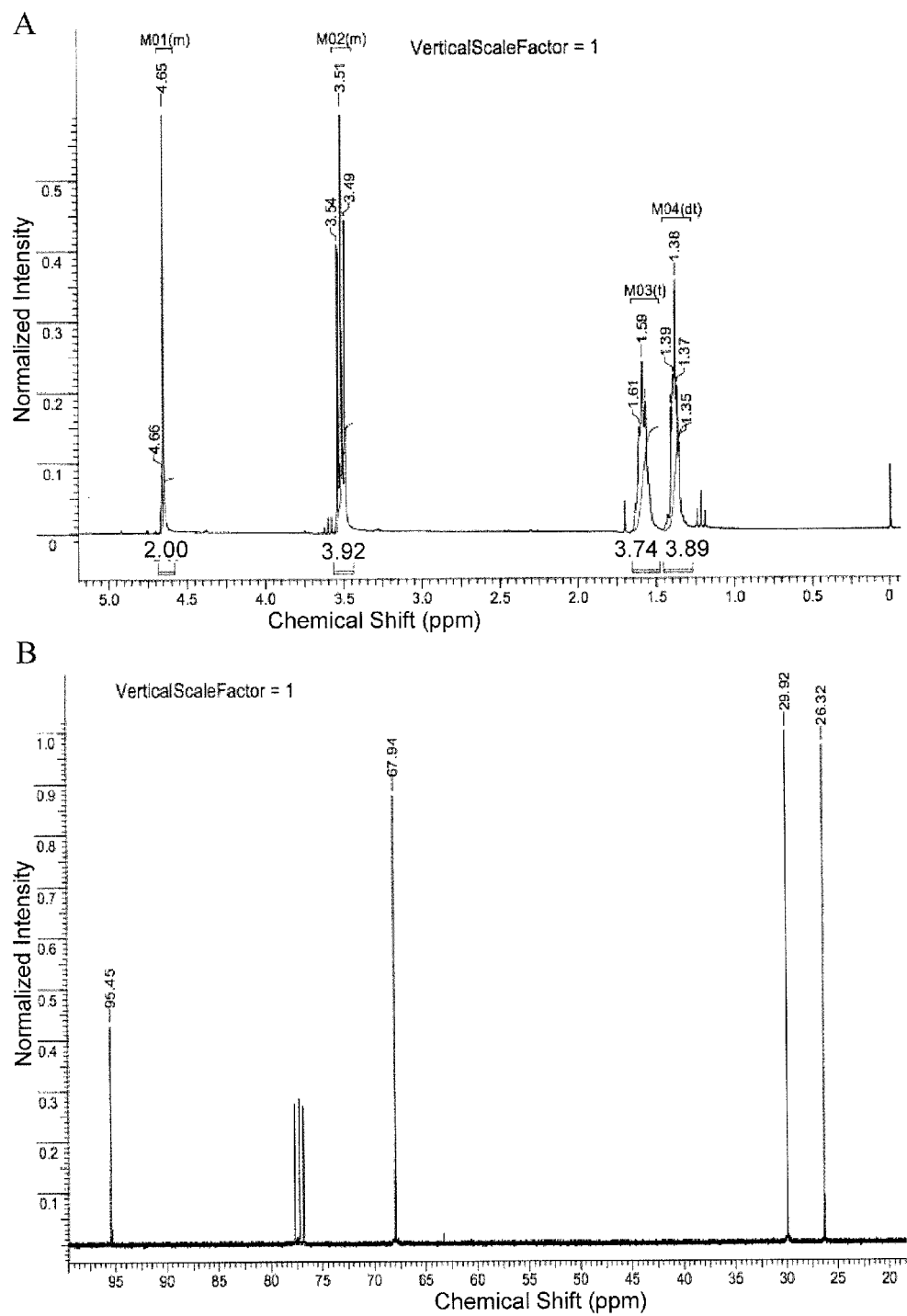
FIG. 15 shows a) $^1$H NMR and b) $^{13}$C spectra for polyhexylene acetal according to an embodiment of the invention.

Polyhexylene acetal (Table 1, Entry 2) A 100 mL round bottom flask was charged with 1.18 g (10 mmol) of 1,6-hexanediol, 38 mg (2 mol %) of para-toluenesulfonic acid (PTSA), 15 mL of xylenes, and 37.55 mL (300 mmol) of diethoxymethane. The mixture was stirred under nitrogen atmosphere for 1 hour at 80° C. The temperature was raised to 115° C. and the stirring continued for 2 hours. The temperature was raised to 135° C. and stirred for 2 hours. The temperature was raised to 200° C. for an hour and cooled to 135° C. The flask was placed under dynamic vacuum to remove volatiles. The system was kept under vacuum for 1 hour. Upon cooling, the product mixture was dissolved in a minimal amount of methylene chloride and 1 mL of aqueous 1M NaOH solution was added to the mixture to quench acid. The polyacetal was precipitated by adding the methylene chloride solution to 300 mL of cold methanol. The precipitate was filtered and washed with copious amounts of methanol, acetone, and ether. The precipitated polymer was dried under vacuum overnight to yield a white powder in 27% yield. $^1$H NMR (CDCl$_3$): δ ppm 1.38 (dt, J=7.36, 3.68 Hz, 15 H), 1.59 (t, J=6.51 Hz, 15 H), 3.52 (m, 16 H), 4.66 (m, 2 H); $^{13}$C NMR (CDCl$_3$): δ ppm 26.32, 29.92, 67.94, 95.45. FIG. 6 shows the DSC and TGA plots for the polymer, and FIG. 15 shows the $^1$H and $^{13}$C NMR spectra for the polymer.

Figure 7:
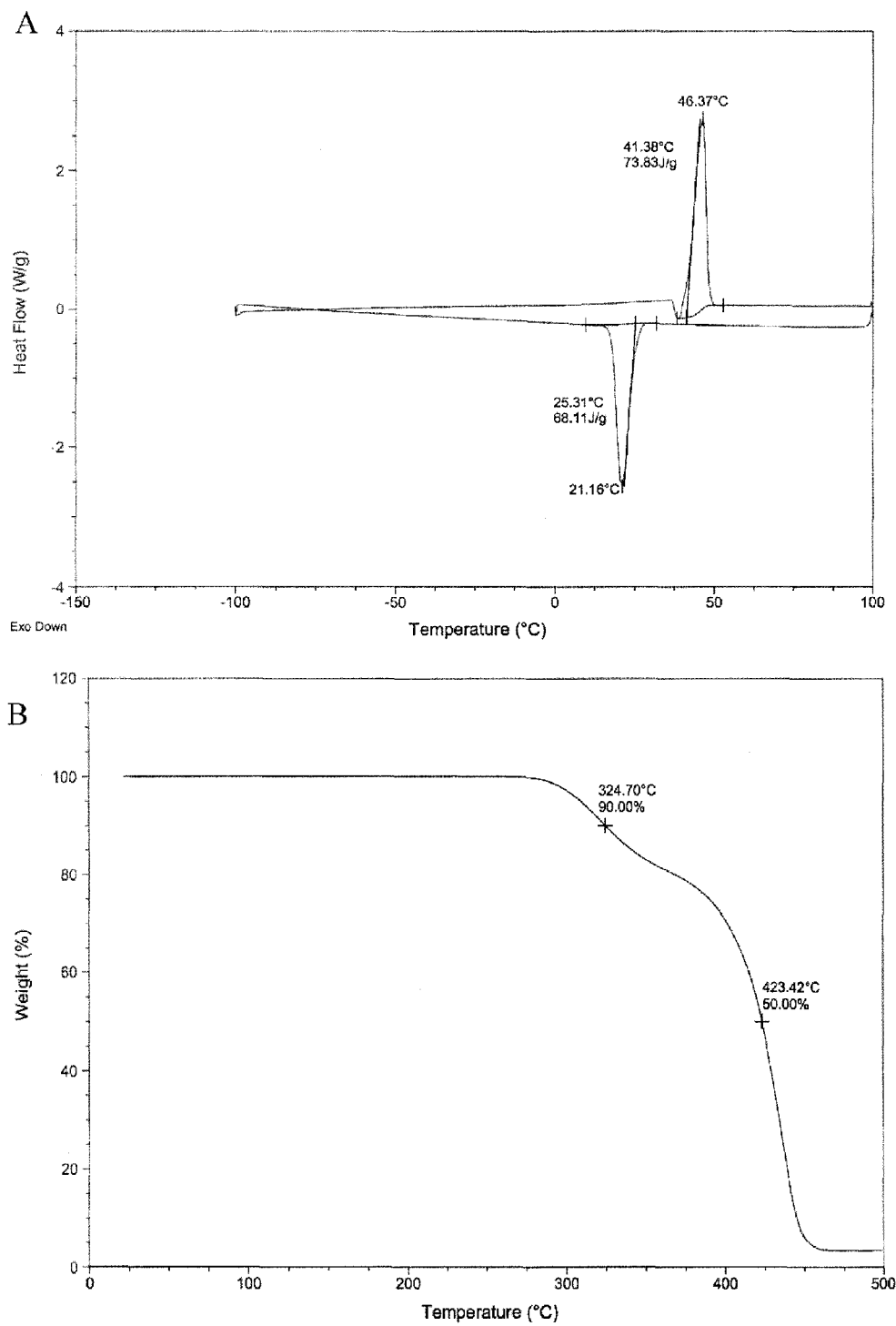
FIG. 7 shows a) DSC and b) TGA plots for polyheptylene acetal according to an embodiment of the invention.
Figure 16:
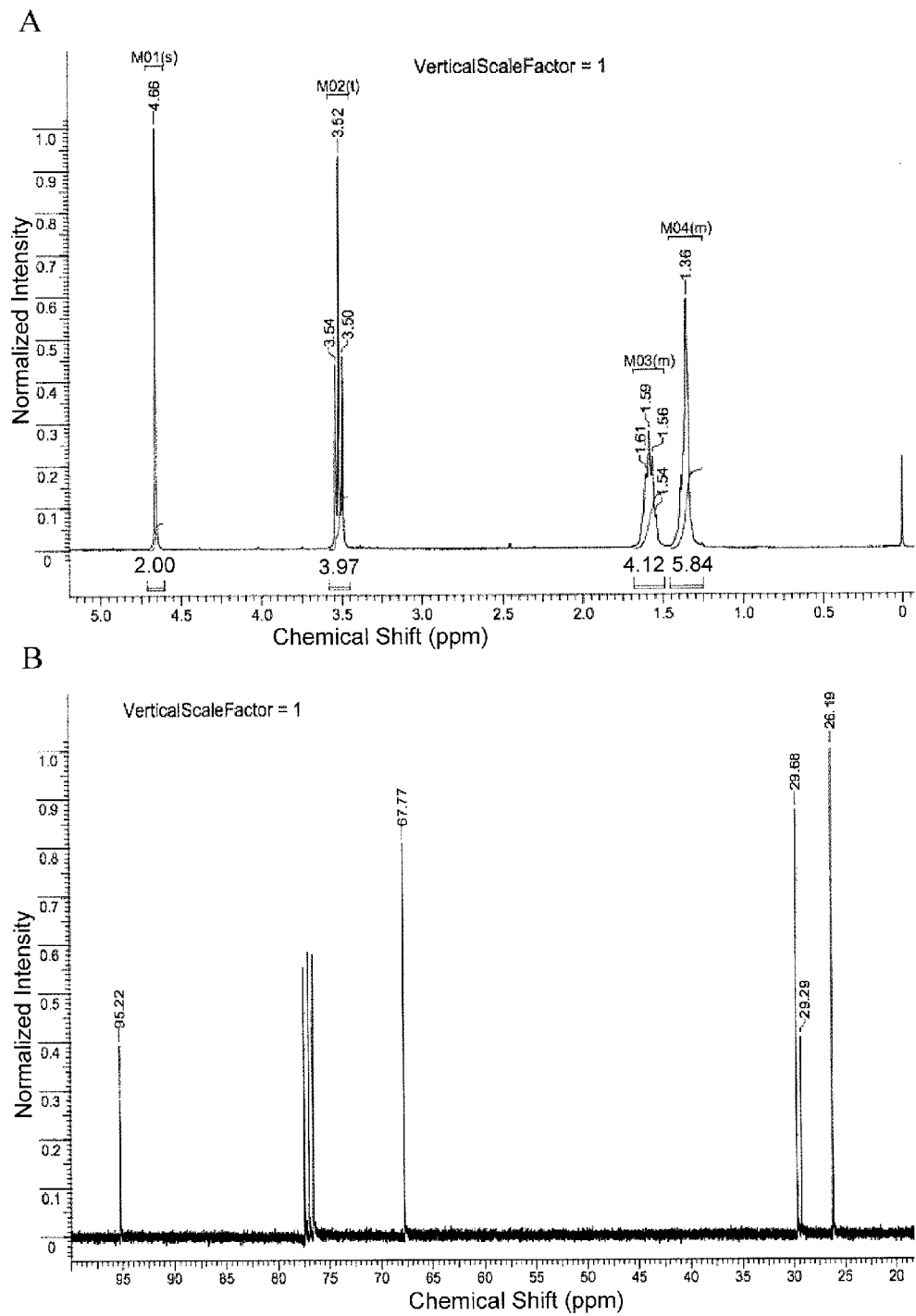
FIG. 16 shows a) $^1$H NMR and b) $^{13}$C spectra for polyheptylene acetal according to an embodiment of the invention.

Polyheptylene acetal (Table 1, Entry 3) A 100 mL round bottom flask was charged with 1.32 g (10 mmol) of 1,7-heptanediol, 38 mg (2 mol %) of PTSA, 15 mL of xylenes, and 37.55 mL (300 mmol) of diethoxymethane. The mixture was stirred under nitrogen atmosphere for 1 hour at 80° C. The temperature was raised to 115° C. and the stirring continued for 1 hour. The temperature was raised to 200° C. over a period of 2 hours under the nitrogen atmosphere. The reaction flask was placed under dynamic vacuum to removal volatiles. The flask was kept under vacuum for 12 hours before cooling. Upon cooling, the product mixture was dissolved in a minimal amount of methylene chloride and 1 mL of aqueous 1M NaOH solution was added to the mixture to quench acid. The polyacetal was precipitated by adding the methylene chloride solution to 300 mL of cold methanol. The precipitate was filtered and washed with copious amounts of methanol, acetone, and ether. The precipitated polymer was dried under vacuum overnight to yield a white powder in 63% yield. $^1$H NMR (CDCl$_3$): δ ppm 1.37 (m, 19 H), 1.57 (m, 13 H), 3.52 (t, J=6.51 Hz, 13 H), 4.66 (s, 2 H); $^{13}$C NMR (CDCl$_3$): δ ppm 26.19, 29.29, 29.68, 67.77, 95.22. FIG. 7 shows the DSC and TGA plots for the polymer, and FIG. 16 shows the $^1$H and $^{13}$C NMR spectra for the polymer.

Figure 8:
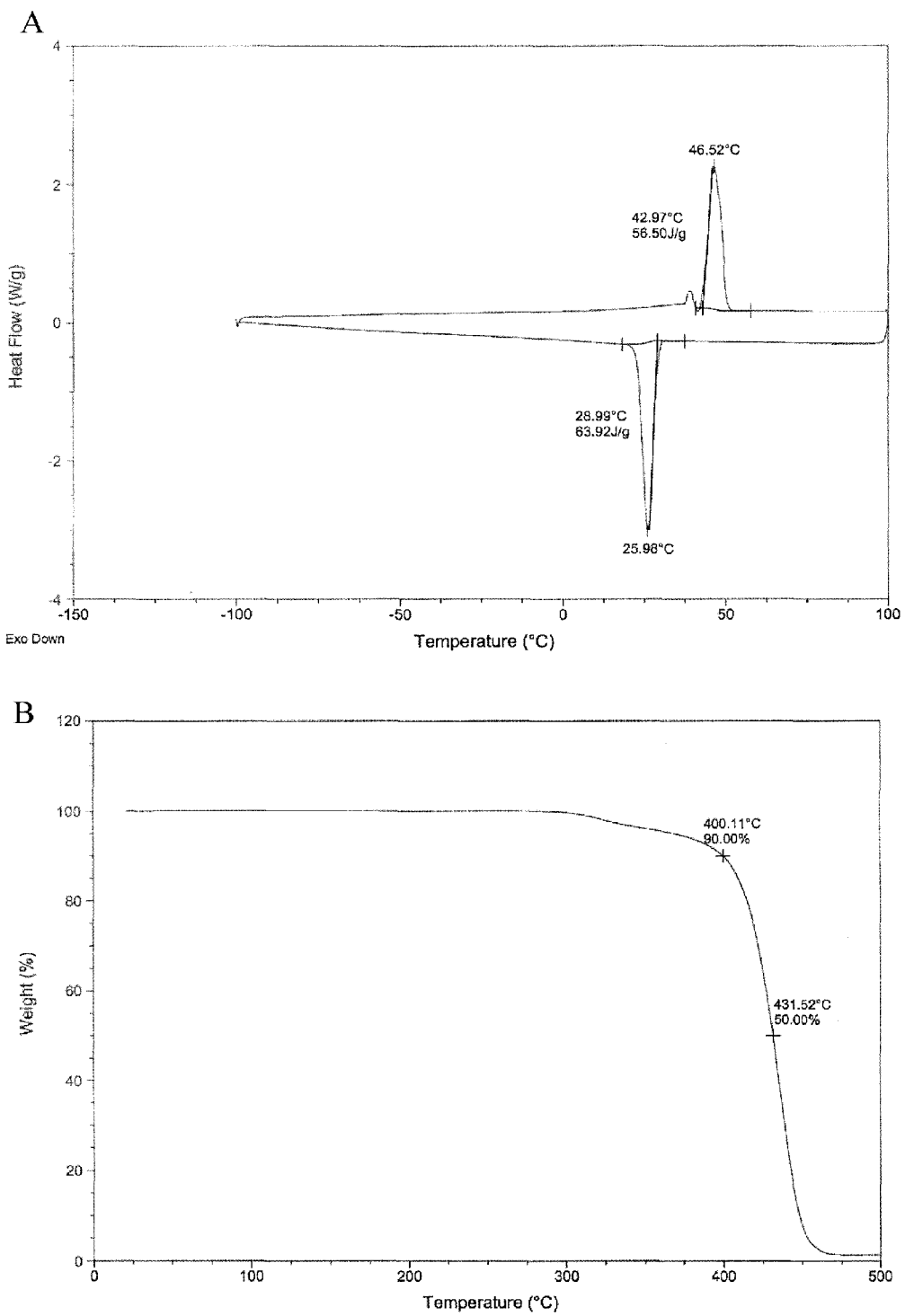
FIG. 8 shows a) DSC and b) TGA plots for polyoctylene acetal according to an embodiment of the invention.
Figure 17:
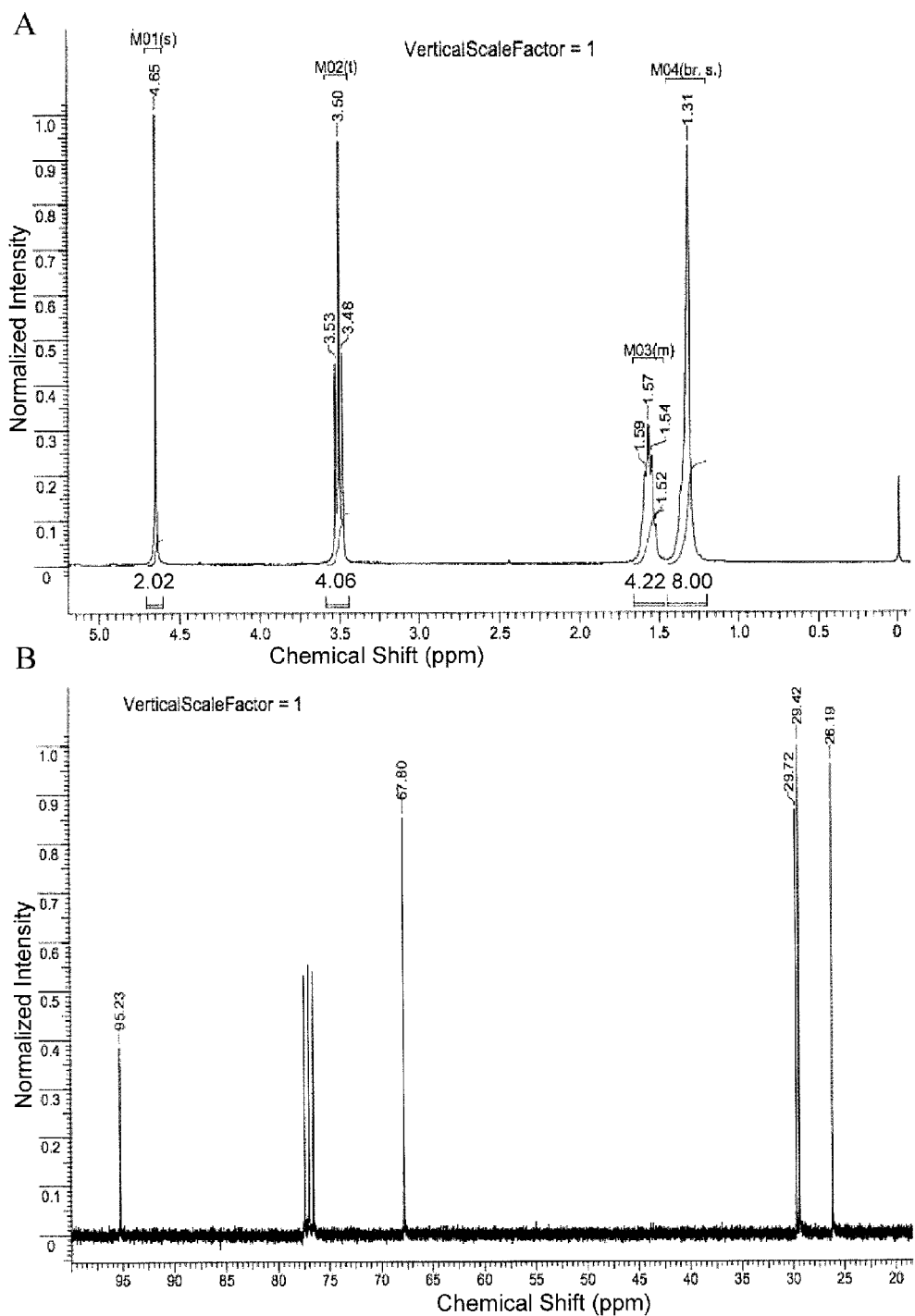
FIG. 17 shows a) $^1$H NMR and b) $^{13}$C spectra for polyoctylene acetal according to an embodiment of the invention.

Polyoctylene acetal (Table S1, Entry 4) A 100 mL round bottom flask was charged with 1.46 g (10 mmol) of 1,8-octanediol, 38 mg (2 mol %) of para-toluenesulfonic acid (PTSA) , 15 mL, of xylenes, and 37.55 mL (300 mmol) of diethoxymethane. The mixture was stirred under a nitrogen atmosphere for 1 hour at 80° C. The temperature was raised to 115° C. and stirring continued for an hour. The temperature was raised to 200° C. over two hours under the nitrogen atmosphere. The reaction flask was placed under dynamic vacuum to remove volatiles. The system was kept under vacuum for 12 hours. Upon cooling, the product mixture was dissolved in a minimal amount of methylene chloride and 1 mL of aqueous 1M NaOH solution was added to the mixture to quench acid. The polyacetal was precipitated by adding the methylene chloride solution to 300 mL of cold methanol. The precipitate was filtered and washed with copious amounts of methanol, acetone, and ether. The precipitated polymer was dried under vacuum overnight to yield a white powder in 79% yield. $^1$H NMR (CDCl$_3$) δ ppm 1.31 (br. s., 8 H), 1.56 (m, 4 H), 3.50 (t, J=6.51 Hz, 4 H), 4.65 (s, 2 H); $^{13}$C NMR (CDCl$_3$) δ ppm 26.19, 29.42, 29.72, 67.80, 95.23. FIG. 8 shows the DSC and TGA plots for the polymer, and FIG. 17 shows the $^1$H and $^{13}$C NMR spectra for the polymer.

Figure 9:
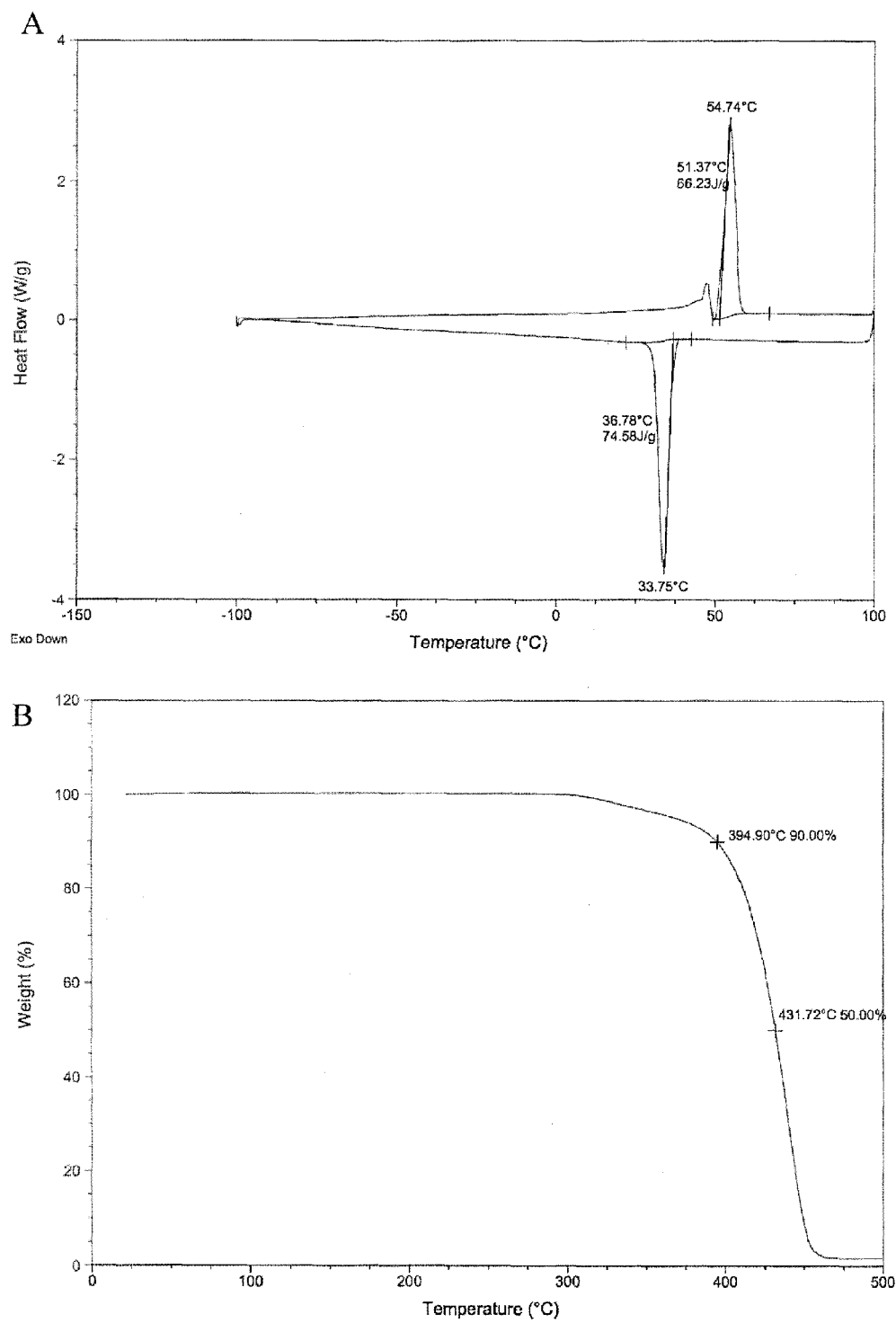
FIG. 9 shows a) DSC and b) TGA plots for polynonylene acetal according to an embodiment of the invention.
Figure 18:
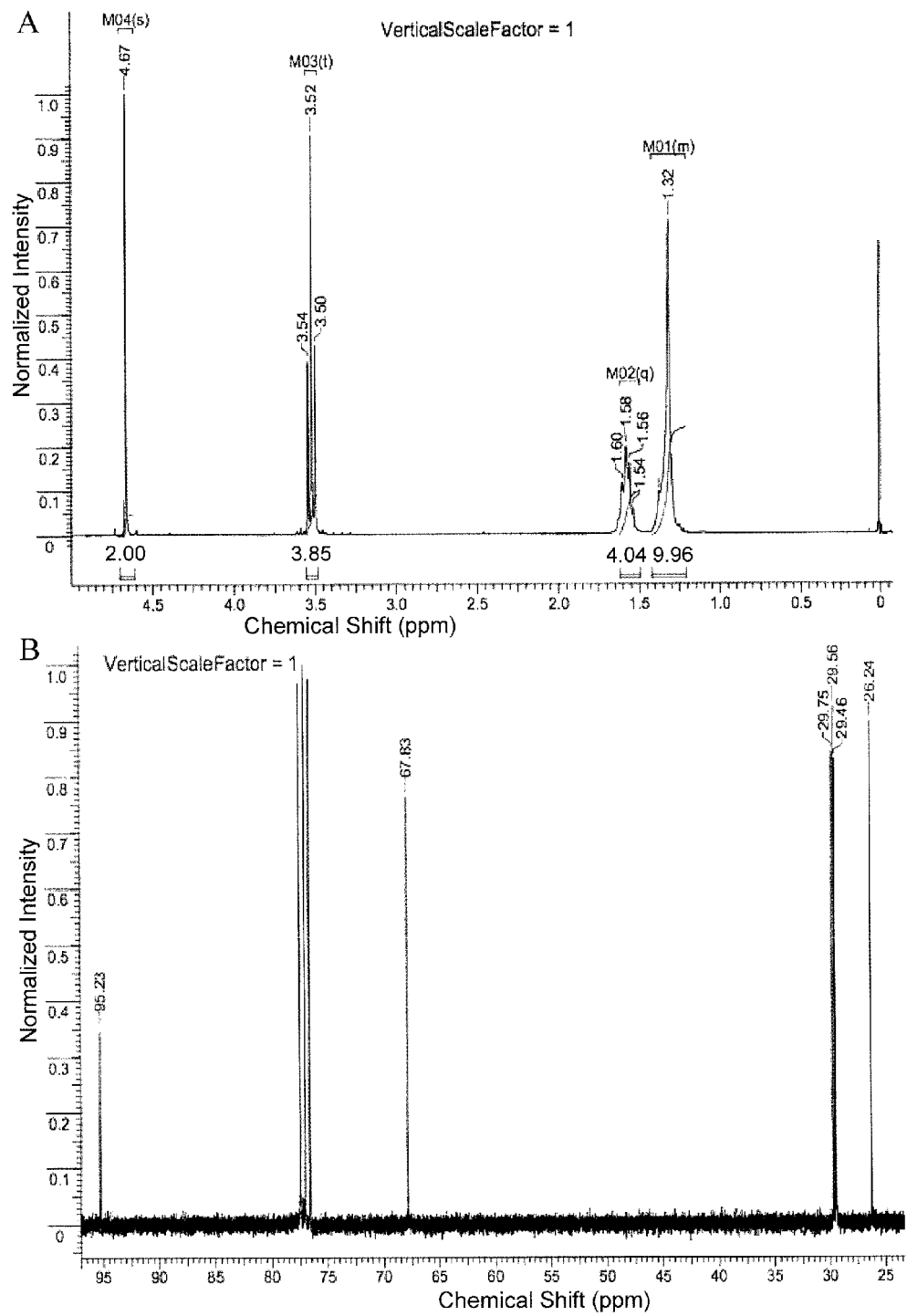
FIG. 18 shows a) $^1$H NMR and b) $^{13}$C spectra for polynonylene acetal according to an embodiment of the invention.

Polynonylene acetal (Table 1, Entry 5) A 100 mL round bottom flask was charged with 1.60 g (10 mmol) of 1,9-nonanediol, 38 mg (2 mol %) of para-toluenesulfonic acid (PTSA), 15 mL of xylenes, and 37.55 mL (300 mmol) of diethoxymethane. The mixture was stirred under nitrogen atmosphere for 1 hour at 80° C. The temperature was raised to 115° C. and stirring continued for one hour. The temperature was raised to 200° C. over a period of 2 hours under the nitrogen atmosphere. The reaction flask was placed under dynamic vacuum to remove volatiles. The flask was kept under vacuum for 12 hours and cooled. Upon cooling, the product mixture was dissolved in a minimal amount of methylene chloride and 1 mL of aqueous 1M NaOH solution was added to the mixture to quench acid. The polyacetal was precipitated by adding the methylene chloride solution to 300 mL of cold methanol. The precipitate was filtered and washed with copious amounts of methanol, acetone, and ether. The precipitated polymer was dried under vacuum overnight to yield a white powder in 89% yield. $^1$H NMR (CDCl$_3$): δ ppm 1.35 (m, 10 H), 1.57 (q, J=6.74 Hz, 4 H), 3.52 (t, J=6.60 Hz, 9 H), 4.67 (s, 2 H); $^{13}$C NMR (CDCl$_3$) δ ppm 26.24, 29.43, 29.75, 67.83, 95.24. FIG. 9 shows the DSC and TGA plots for the polymer, and FIG. 18 shows the $^1$H and $^{13}$C NMR spectra for the polymer.

Figure 10:
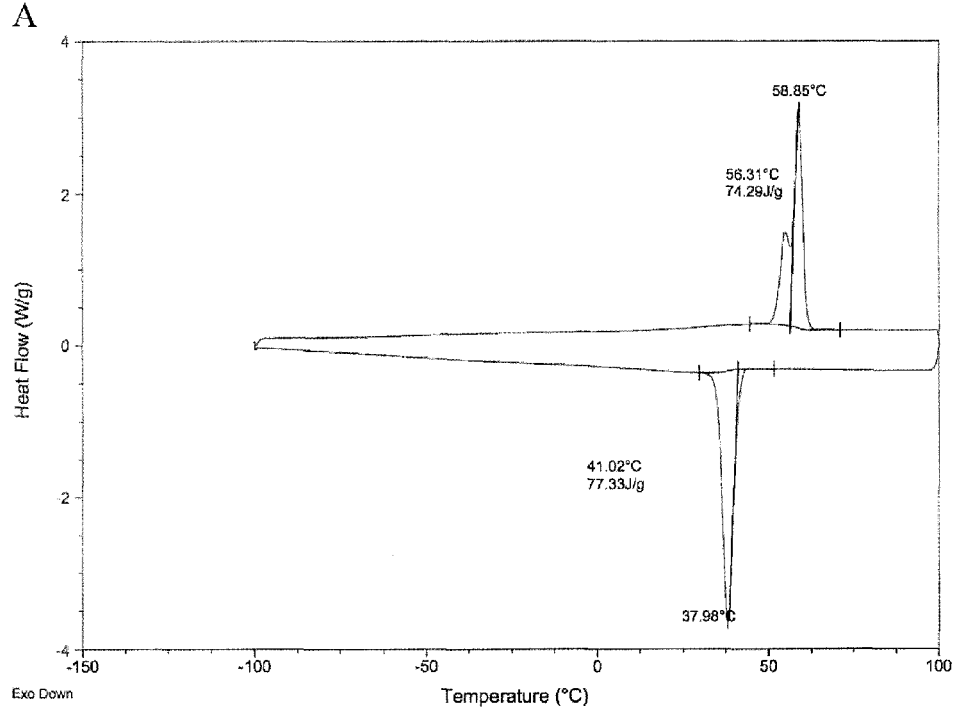
FIG. 10 shows a) DSC and b) TGA plots for polydecylene acetal according to an embodiment of the invention.
Figure 10:
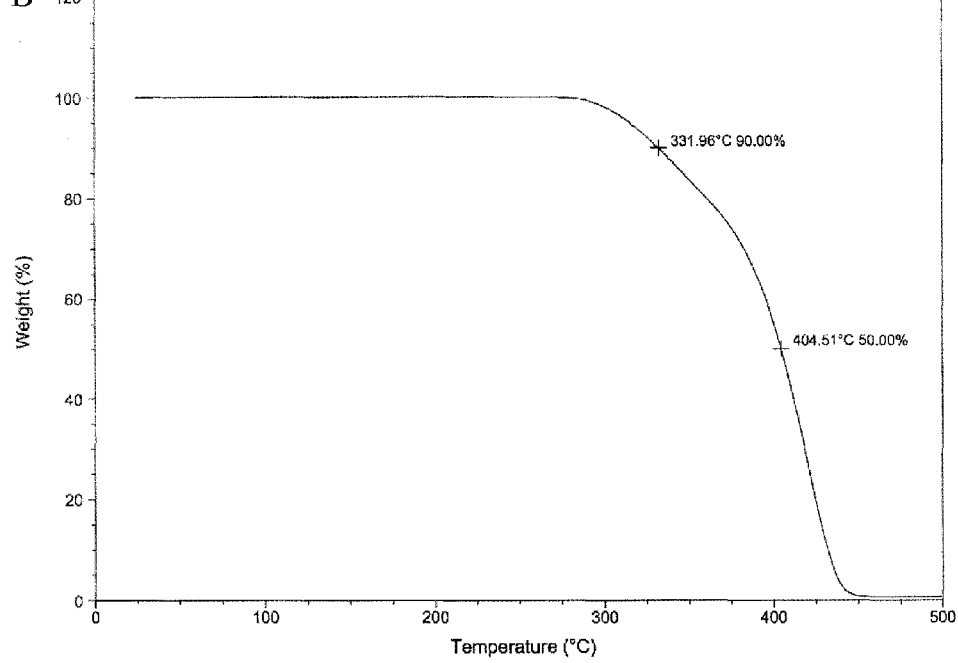
Figure 19:
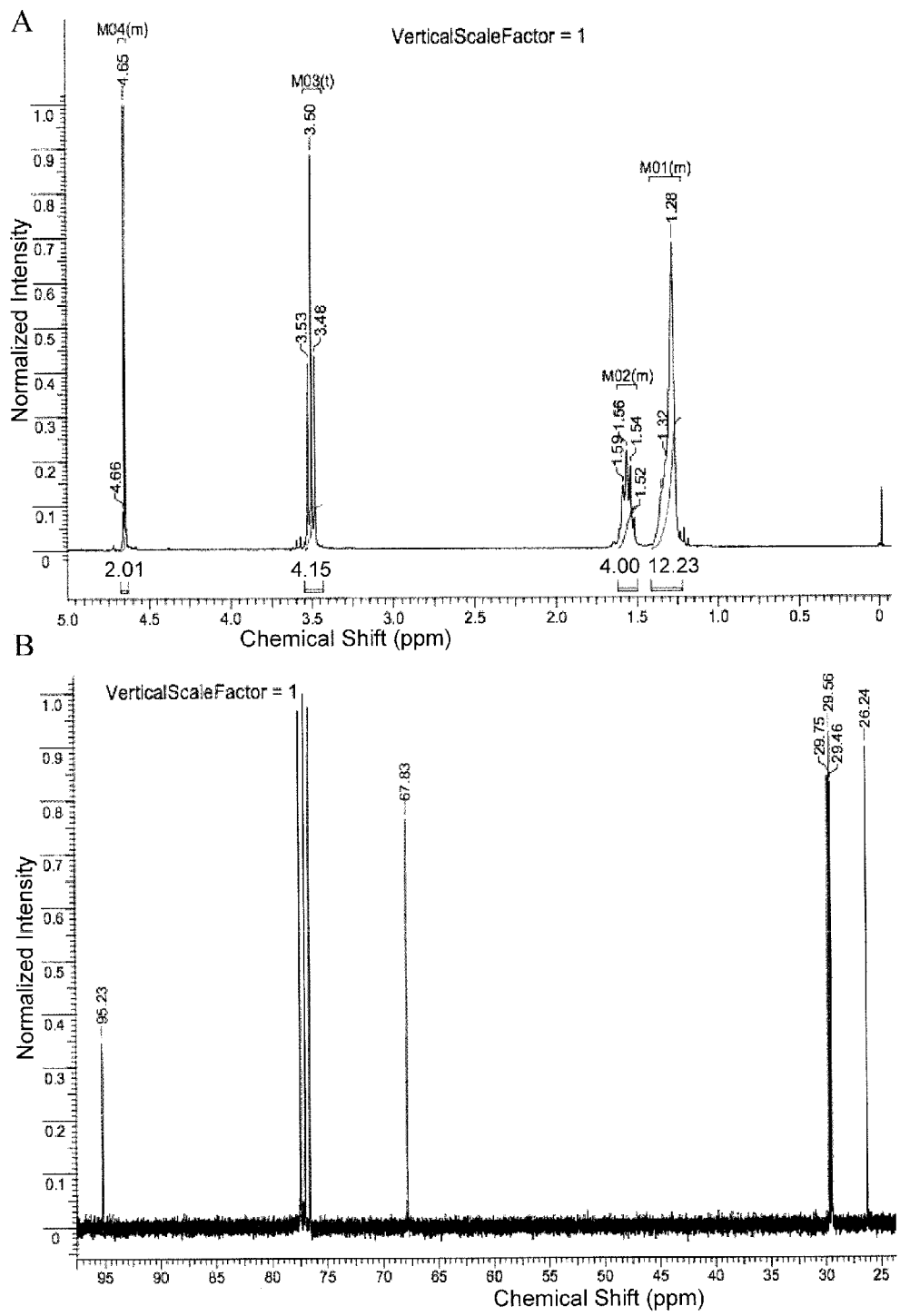
FIG. 19 shows a) $^1$H NMR and b) $^{13}$C spectra for polydecylene acetal according to an embodiment of the invention.

Polydecylene acetal (Table 1, Entry 6) A 100 mL round bottom flask was charged with 1.74 g (10 mmol) of 1,10-decanediol, 38 mg (2 mol %) of para-toluenesulfonic acid (PTSA), 15 mL of xylenes, and 37.55 mL (300 mmol) of diethoxymethane. The mixture was stirred under nitrogen atmosphere for one hour at 80° C. The temperature was raised to 115° C. and stirring continued for one hour. The temperature was raised to 200° C. over two hours still under nitrogen atmosphere. The reaction flask was placed under dynamic vacuum to remove volatiles. The flask was kept under vacuum for 12 hours and cooled. Upon cooling, the product mixture was dissolved in a minimal amount of methylene chloride and 1 mL of aqueous 1M NaOH solution was added to the mixture to quench acid. The polyacetal was precipitated by adding the methylene chloride solution to 300 mL of cold methanol. The precipitate was filtered and washed with copious amounts of methanol, acetone, and ether. The precipitated polymer was dried under vacuum overnight to yield a white powder in 82% yield. $^1$H NMR (CDCl$_3$): δ ppm 1.28 (br. s., 12 H), 1.56 (m, 4 H), 3.51 (t, J=6.65 Hz, 4 H), 4.65 (s, 2 H); $^{13}$C NMR (CDCl$_3$): δ ppm 26.24, 29.46, 29.56, 29.75, 67.83, 95.23. FIG. 10 shows the DSC and TGA plots for the polymer, and FIG. 19 shows the $^1$H and $^{13}$C NMR spectra for the polymer.

Polydecylene acetal (Table 1, Entry 7) A 100 mL round bottom flask was charged with 2.901 g (10 mmol) of 3,5,16,18-tetraoxaicosane (decanediol bisacetal), and 19 mg (1 mol %) of para-toluenesulfonic acid (PTSA). The mixture was stirred under a nitrogen atmosphere for 30 minutes at room temperature and the temperature was raised to 125° C. The mixture was stirred under the inert atmosphere at 125° C. for 30 minutes and placed under vacuum for two hours. The temperature was raised to 200° C. and stirring continued for 10 hours and the mixture was cooled. Upon cooling, the product mixture was dissolved in a minimal amount of methylene chloride and 1 mL of aqueous 1M NaOH solution was added to the mixture to quench acid. The polyacetal was precipitated by adding the methylene chloride solution to 300 mL of cold methanol. The precipitate was filtered and washed with copious amounts of methanol, acetone, and ether. The precipitated polymer was dried under vacuum overnight to yield a white powder in 95% yield. $^1$H NMR (CDCl$_3$): δ ppm 1.32 (m, 12 H), 1.55 (m, 4 H), 3.50 (t, J=6.60 Hz, 10 H), 4.65 (m, 2 H); $^{13}$C NMR (CDCl$_3$): δ ppm 26.23, 29.45, 29.55, 29.74, 67.82, 95.22.

Figure 11:
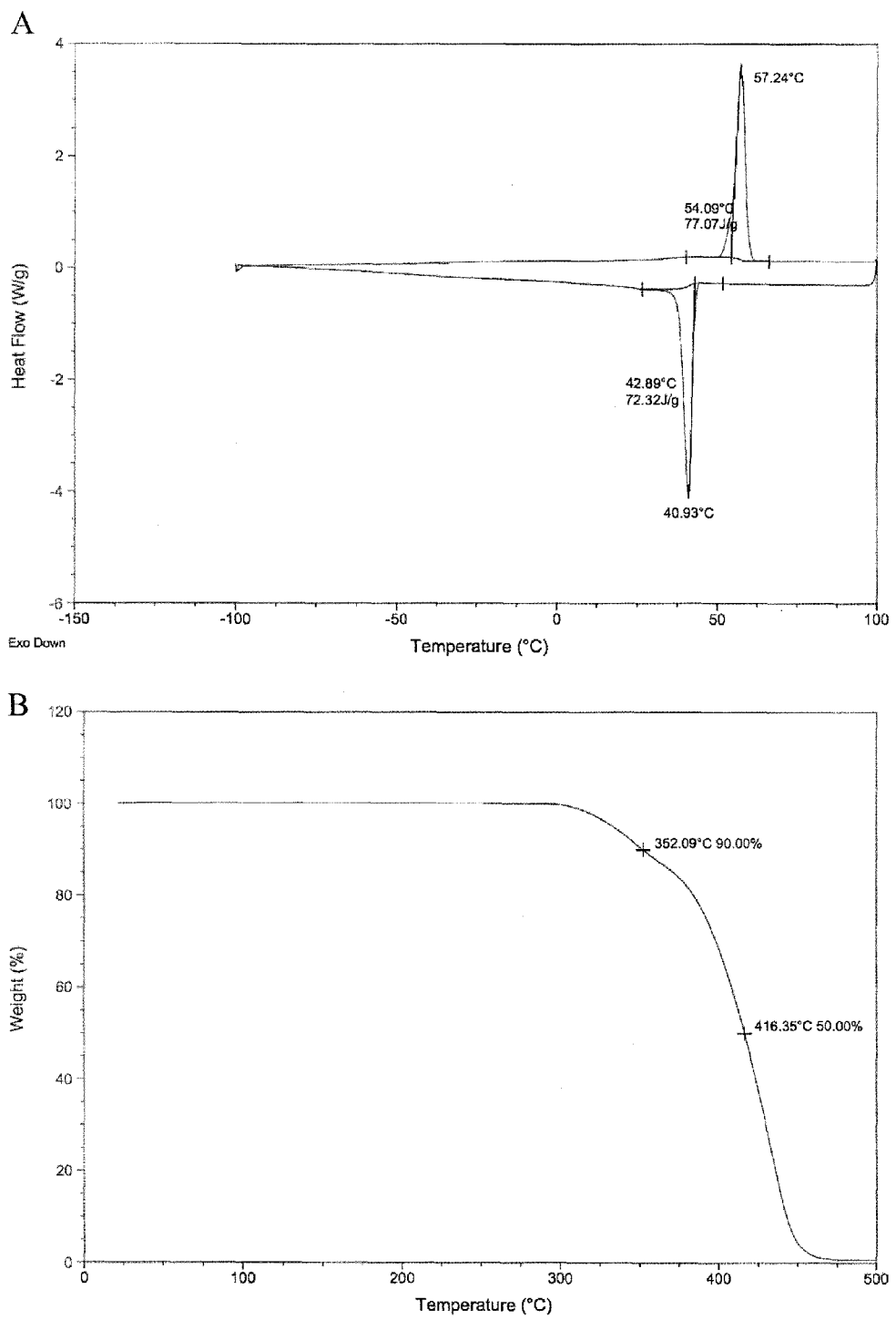
FIG. 11 shows a) DSC and b) TGA plots for polyundecylene acetal according to an embodiment of the invention.
Figure 20:
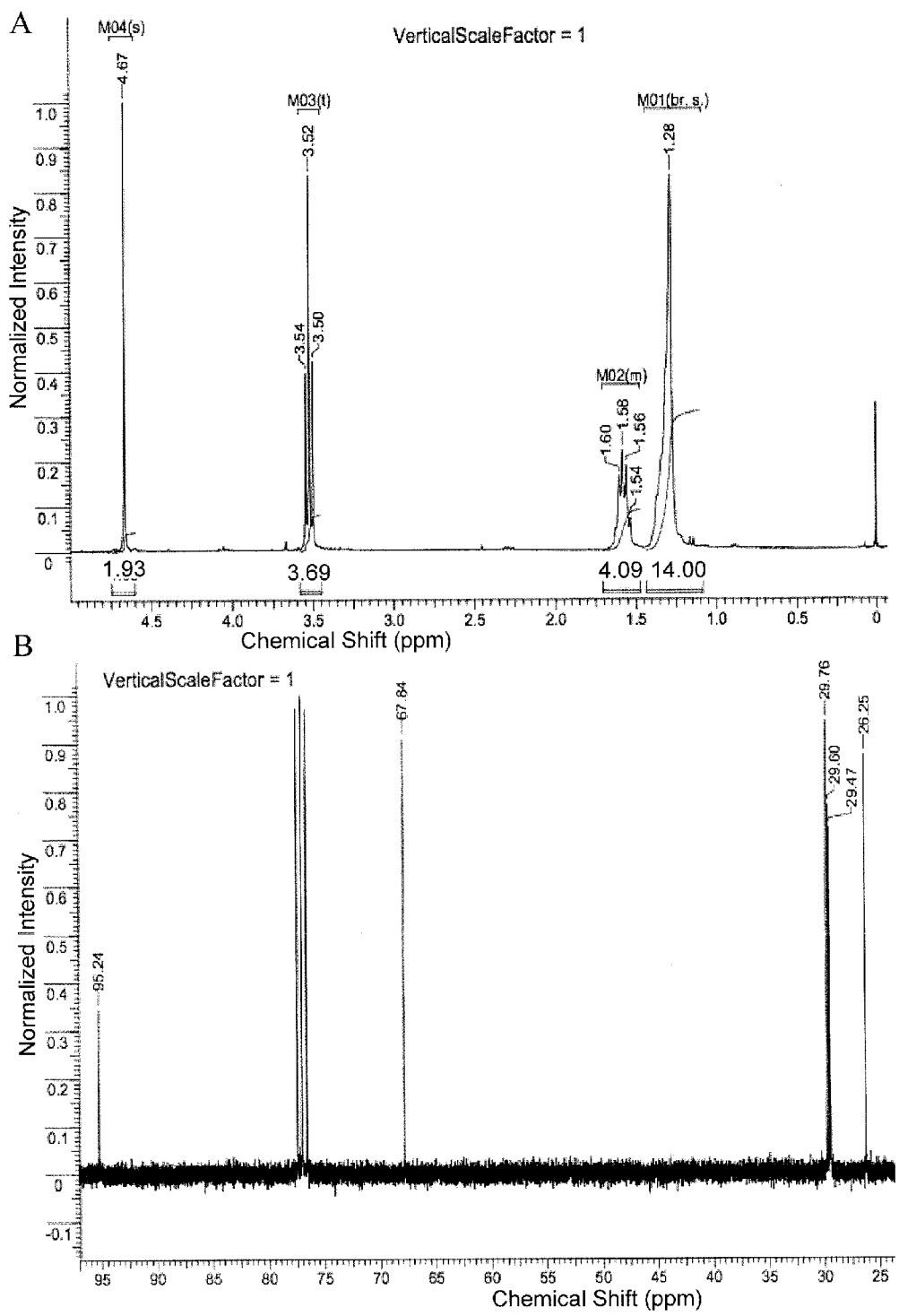
FIG. 20 shows a) $^1$H NMR and b) $^{13}$C spectra for polyundecylene acetal according to an embodiment of the invention.

Polyundecylene acetal (Table 1, Entry 8) A 100 mL round bottom flask was charged with 1.88 g (10 mmol) of 1,11-undecanediol, 38 mg (2 mol %) of para-toluenesulfonic acid (PTSA), and 37.55 mL (300 mmol) of diethoxymethane. The mixture was stirred under a nitrogen atmosphere for one hour at 80° C. The temperature was raised to 115° C. and stirring continued for one hour. The temperature was raised to 200° C. over a period of two hours under the nitrogen atmosphere. The reaction flask was placed under a dynamic vacuum to remove volatiles. The flask was kept under vacuum for 12 hours and cooled. Upon cooling, the product mixture was dissolved in a minimal amount of methylene chloride and 1 mL of aqueous 1M NaOH solution was added to the mixture to quench acid. The polyacetal was precipitated by adding the methylene chloride solution to 300 mL of cold methanol. The precipitate was filtered and washed with copious amounts of methanol, acetone, and ether. The precipitated polymer was dried under vacuum overnight to yield a white powder in 87% yield. $^1$H NMR (CDCl$_3$): δ ppm 1.28 (br. s., 14 H), 1.57 (m, 4 H), 3.52 (t, J=6.60 Hz, 4 H), 4.67 (s, 2 H); $^{13}$C NMR (CDCl$_3$): δ ppm 26.25, 29.47, 29.57, 29.60, 29.76, 67.84, 95.24. FIG. 11 shows the DSC and TGA plots for the polymer, and FIG. 20 shows the $^1$H and $^{13}$C NMR spectra for the polymer.

Figure 12:
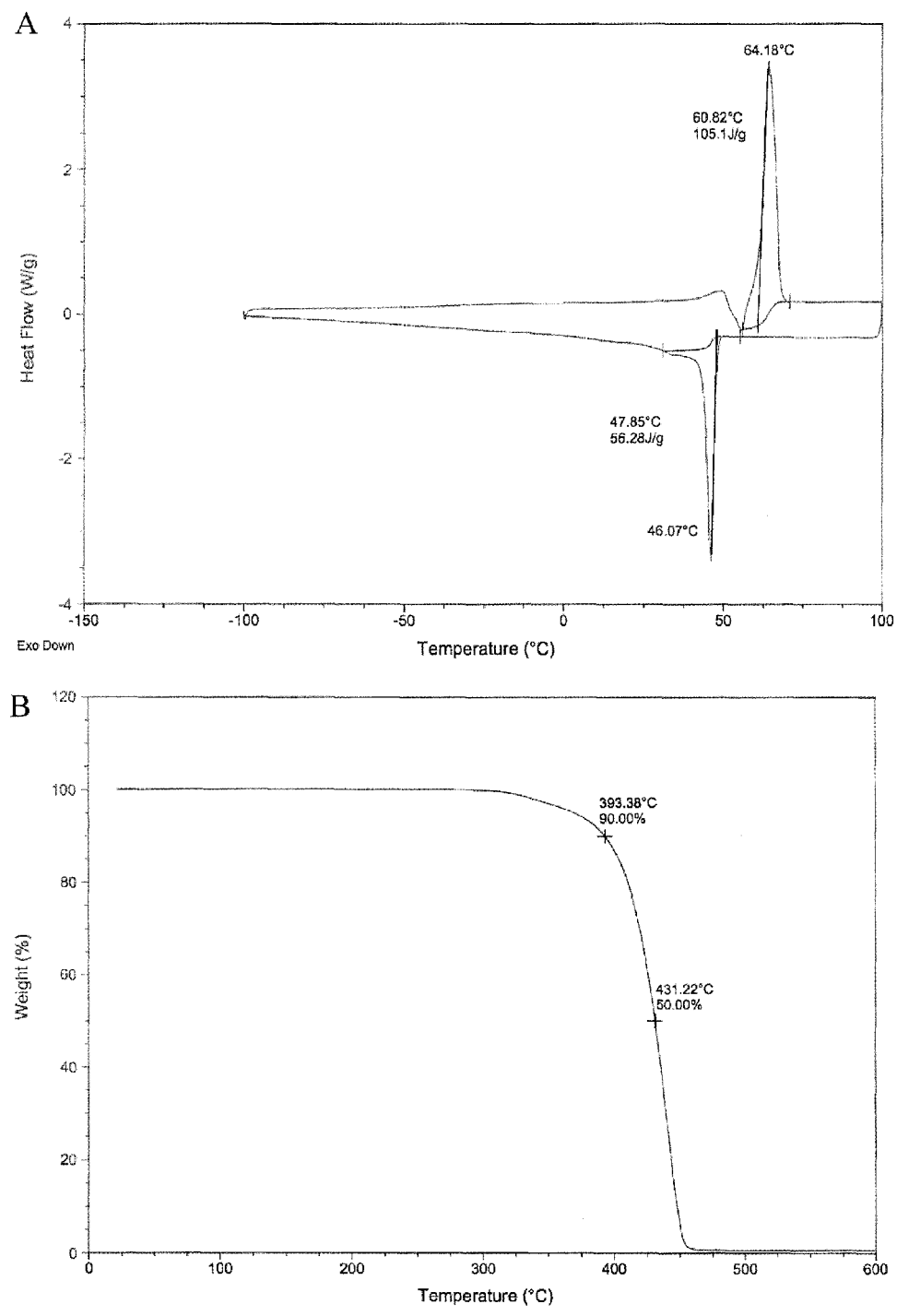
FIG. 12 shows a) DSC and b) TGA plots for polydodecylene acetal according to an embodiment of the invention.
Figure 21:
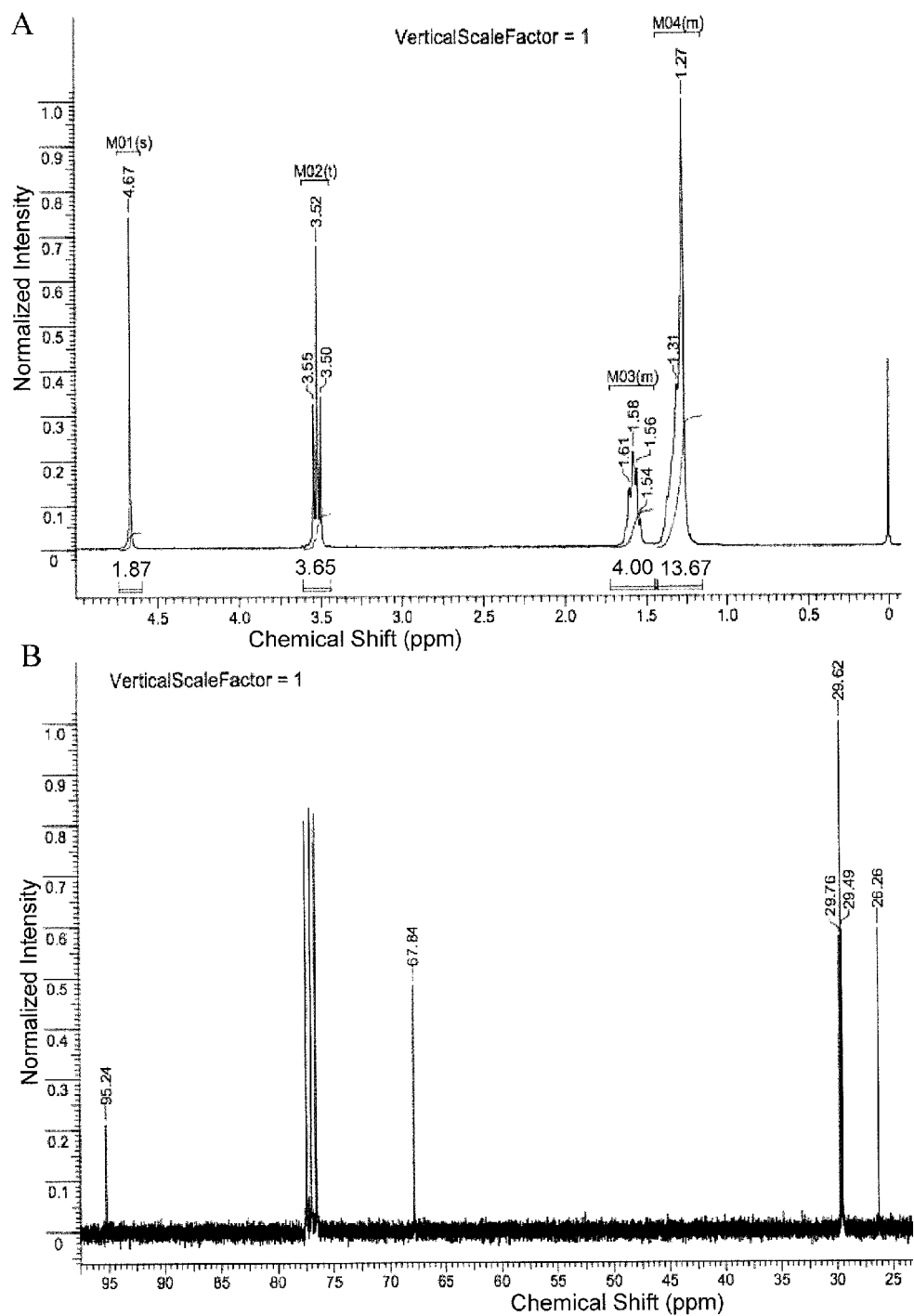
FIG. 21 shows a) $^1$H NMR and b) $^{13}$C spectra for polydodecylene acetal according to an embodiment of the invention.

Polydodecylene acetal (Table 1, Entry 9) A 100 mL round bottom flask was charged with 2.02 g (10 mmol) of 1,12-dodecanediol, 38 mg (2 mol %) of para-toluenesulfonic acid (PTSA), and 37.55 mL (300 mmol) of diethoxymethane. The mixture was stirred under a nitrogen atmosphere for one hour at 80° C. The temperature was raised to 115° C. and stirring continued for one hour. The temperature was raised to 200° C. over two hours under the nitrogen atmosphere. The reaction flask was placed under dynamic vacuum to remove volatiles. The flask was kept under vacuum for 12 hours and cooled. Upon cooling, the product mixture was dissolved in a minimal amount of methylene chloride and 1 mL of aqueous 1M NaOH solution was added to quench acid. The polyacetal was precipitated by adding the methylene chloride solution to 300 mL of cold methanol. The precipitate was filtered and washed with copious amounts of methanol, acetone, and ether. The precipitated polymer was dried under vacuum overnight to yield a white powder in 85% yield. $^1$H NMR (CDCl$_3$): δ ppm 1.29 (m, 16 H), 1.57 (m, 4 H), 3.52 (t, J=6.65 Hz, 4 H), 4.67 (s, 2 H); $^{13}$C NMR (CDCl$_3$): δ ppm 26.26, 29.49, 29.62, 29.76, 67.84, 95.24. FIG. 12 shows the DSC and TGA plots for the polymer, and FIG. 21 shows the $^1$H and $^{13}$C NMR spectra for the polymer.

Figure 13:
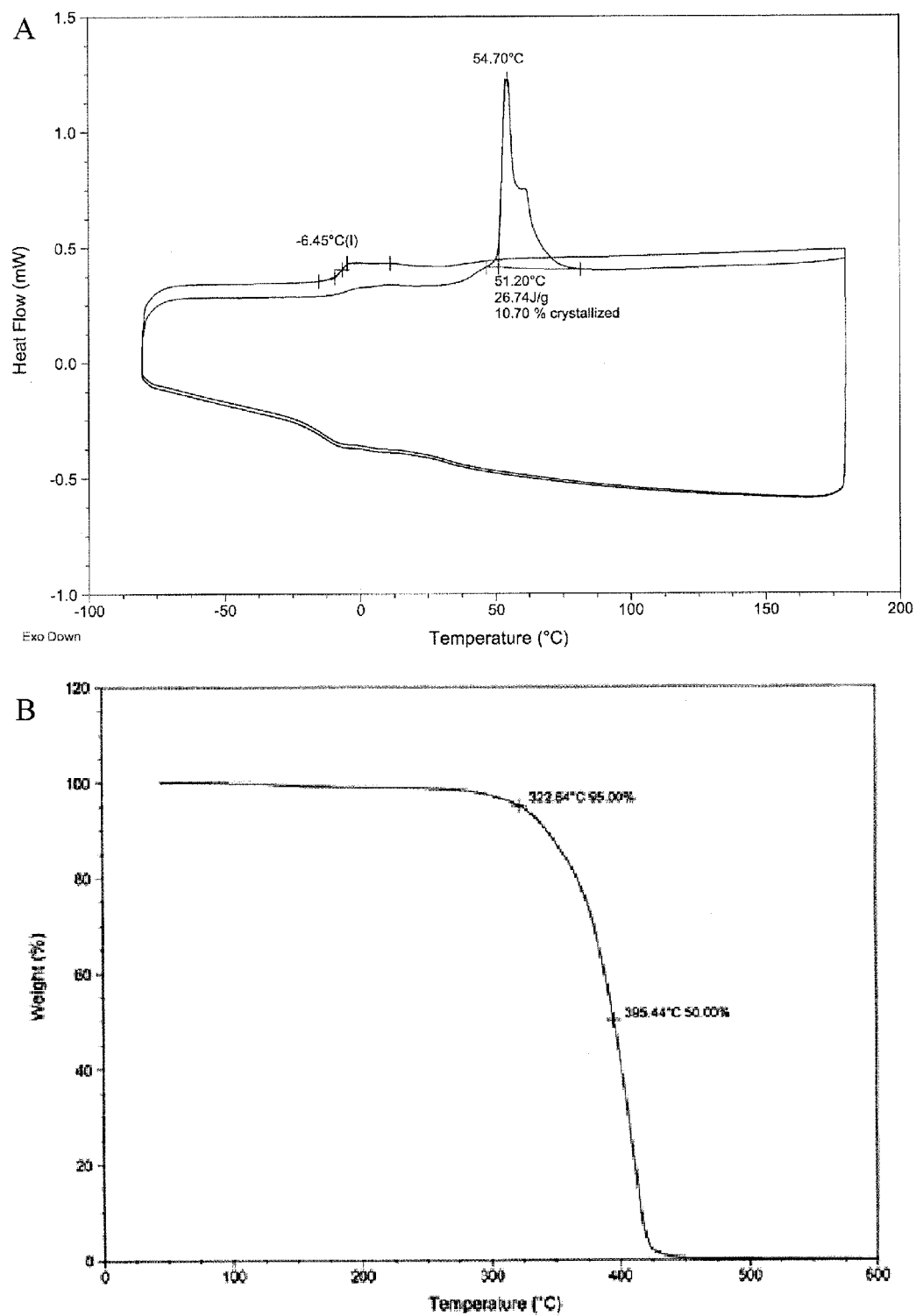
FIG. 13 shows a) DSC and b) TGA plots for poly(1,4-cyclohexanedimethylene acetal) according to an embodiment of the invention.
Figure 22:
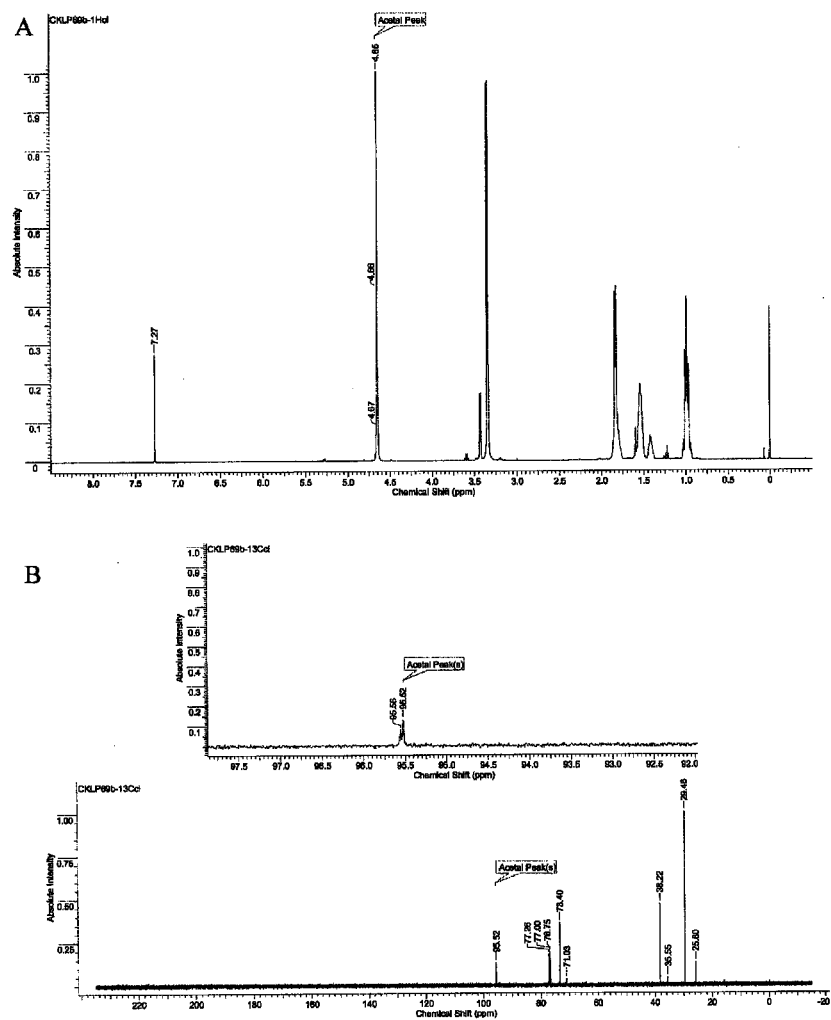
FIG. 22 shows a) $^1$H NMR and b) $^{13}$C spectra for poly(1,4-cyclohexanedimethylene acetal) according to an embodiment of the invention.

Polydecylene acetal (Table 1, Entry 11) A 50 mL round bottom flask was charged with 500 mg sample of polydecylene acetal [M$_n$=7,800, PDI=1.67], 19 mg of para-toluenesulfonic acid (PTSA), 18.78 mL (150 mmol) of diethoxymethane, and 10 mL of xylenes. The mixture was stirred under a nitrogen atmosphere for 1 hour at 80° C. The temperature was raised to 115° C. and stirring continued for an hour. The temperature was raised to 200° C. over two hours under the nitrogen atmosphere. The reaction flask was placed under dynamic vacuum to remove volatiles. The flask was kept under vacuum for three hours and cooled. Upon cooling, the product mixture was dissolved in a minimal amount of methylene chloride and 1 mL of aqueous 1M NaOH solution was added to the mixture to quench excess acid. The polyacetal was precipitated by adding the methylene chloride solution to 300 mL of cold methanol. The precipitate was filtered and washed with copious amounts of methanol, acetone, and ether. The precipitated polymer was dried under vacuum overnight to yield 0.563 g of a sticky white solid in 36% yield. FIG. 13 shows the DSC and TGA plots for the polymer, and FIG. 22 shows the $^1$H and $^{13}$C NMR spectra for the polymer.

TABLE 1

Polymerization results and characterization of polyalkylene acetals.

| entry | Polymer | yield (%) | M$_n$ (g/mol) | PDI | T$_m$ (° C.) |
|---|---|---|---|---|---|
| 1[a] | | 48 | 9,700 | 1.36 | 38 |
| 2[a] | | 27 | 8,800 | 1.23 | 27 |
| 3 | | 63 | 25,800 | 2.43 | 46 |
| 4 | | 79 | 38,000 | 1.90 | 47 |
| 5 | | 89 | 38,500 | 1.99 | 54 |
| 6 | | 82 | 30,500 | 2.06 | 59 |
| 7[b] | | 68[c] | 22,000 | 1.83 | 59 |
| 8 | | 85 | 20,700 | 2.48 | 57 |
| 9 | | 85 | 37,100 | 1.91 | 64 |
| 10[d] | | 96 | 7,800 | 1.67 | 58 |
| 11[e] | | 70 | 29,200 | 2.37 | — |
| 12 | | 36 | 33,000 | 1.85 | 55 |

[a]Vacuum stage of the reaction was done at 125° C. for only 1 hour.
[b]Two-step polymerization, 1 mol % of catalyst.
[c]Yield over two steps.
[d]First polymerization and isolation.
[e]Second polymerization of the polymer of entry 10.

Polyacetal Preparation in Toluene

Figure 4:
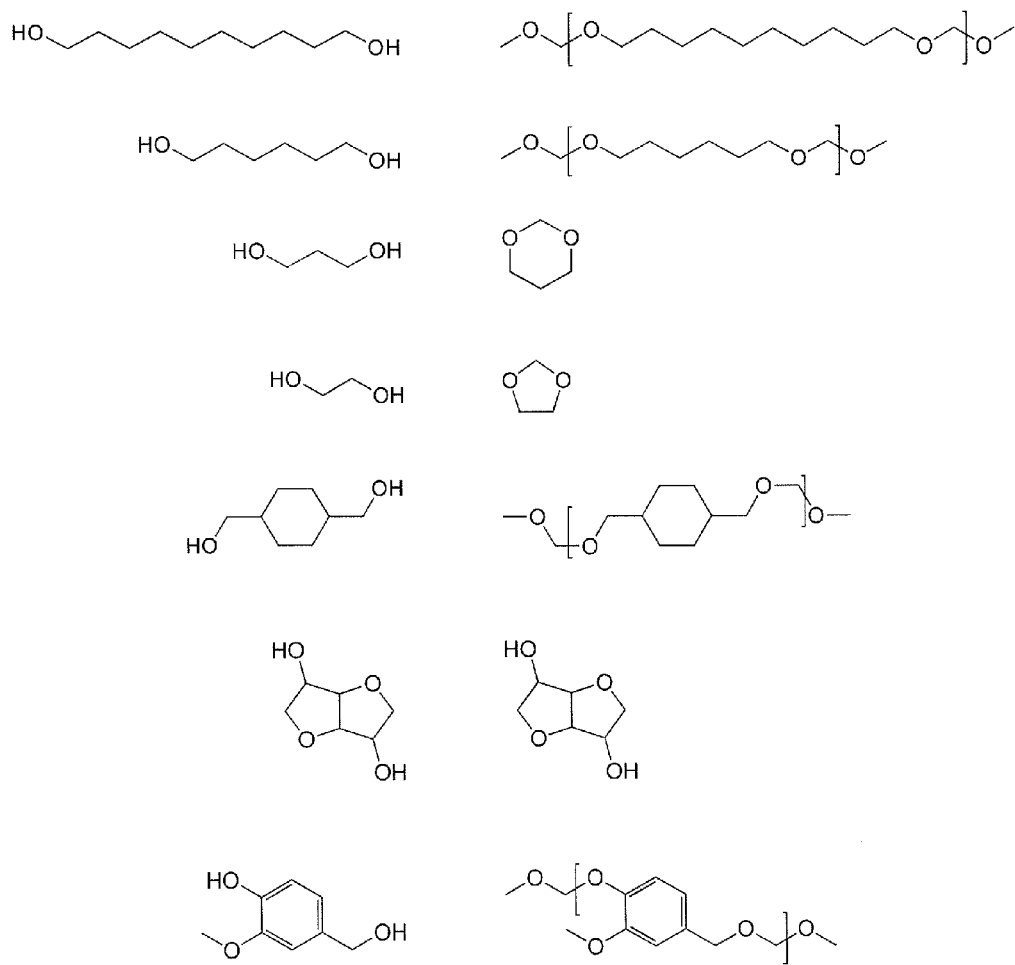
FIG. 4 gives the structure of various diols and the polyacetal repeating units therefrom according to embodiments of the invention.

A mass equivalent to 12.5 mmol of the appropriate diol was placed in a 100 mL pear flask. To the flask was added 25 mg (~1 mol %) of p-toluenesulfonic acid monohydrate with 20 mL (160 mmol) of diethoxymethane, and 30 mL of toluene. Examples of the diols and the resulting polyacetals are shown in FIG. 4. The flask was connected to a distillation column and the mixture was stirred under a nitrogen atmosphere at 80° C. for 30 minutes. The system was heated gently until ethanol distillation occurred. When ethanol liberation appeared to cease by the loss of condensate in the distillation head, the temperature was raised, and diethoxymethane was distilled from the mixture. Subsequently an additional increase in temperature resulted in the removal of toluene. Heating was maintained for a period in excess of 12 hours. The system was placed under vacuum at 125° C. for an additional 24 hours. After cooling to room temperature, removal of the catalyst and isolation of the polyacetal, NMR spectra were acquired, confirming the presence of the acetal functionality in the polyacetal. The polyacetals were isolated by dissolving the residue after stripping in a minimal amount of methylene chloride to achieve a fluid state, to which 1 mL of aqueous 1M NaOH solution was added to the mixture. The polyacetal was precipitated in 300 mL of cold methanol. The precipitated polyacetal was collected by filtration, washed with copious amounts of methanol, acetone, and ultimately ether prior to drying under vacuum overnight. Results are given in Table 2 for polyacetals derived from various α,ω-alkylenediols.

Neat Polymerization of 2,4,15,17-tetraoxaoctadecane

This liquid monomer 2,4,15,17-tetraoxaoctadecane was combined with the catalyst triflic acid (0.019g, 1 mol %) and heated to 80° C. under dynamic vacuum. After 16 hours the highly viscous but transparent reaction was cooled, the acid quenched, and the polymer precipitated with basic methanol/water, isolated by filtration, and dried under vacuum to provide polydecylene acetal in 78% yield as a white powder.

Copolymerization

Figure 23:
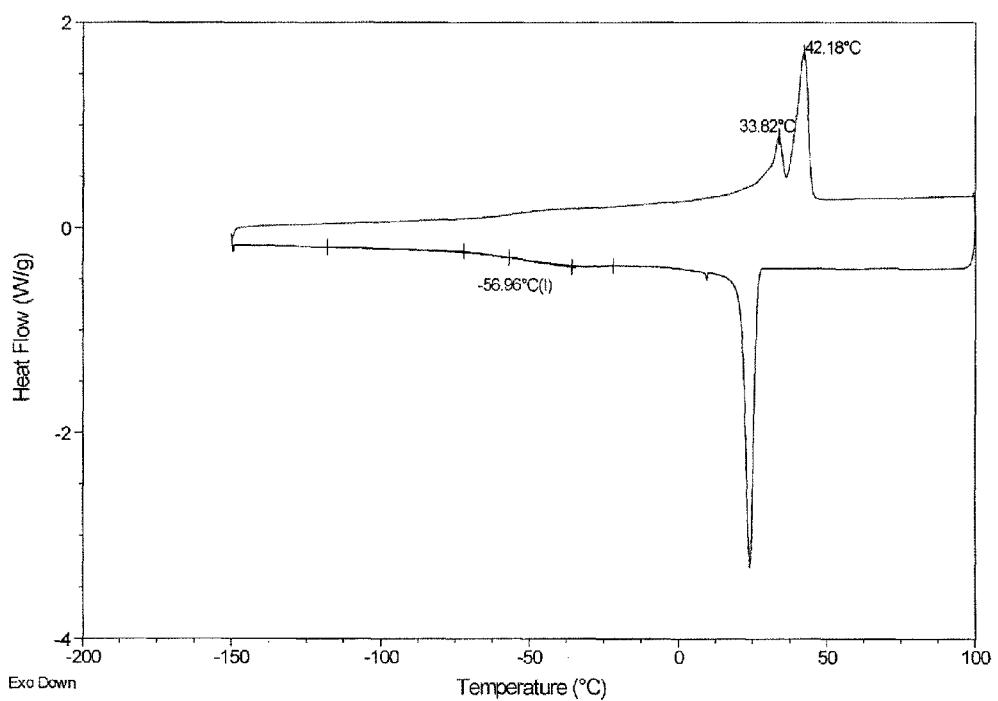
FIG. 23 shows a DSC plot for 1:1 poly(octylene acetal-co-dodecylene acetal) according to an embodiment of the invention.
Figure 24:
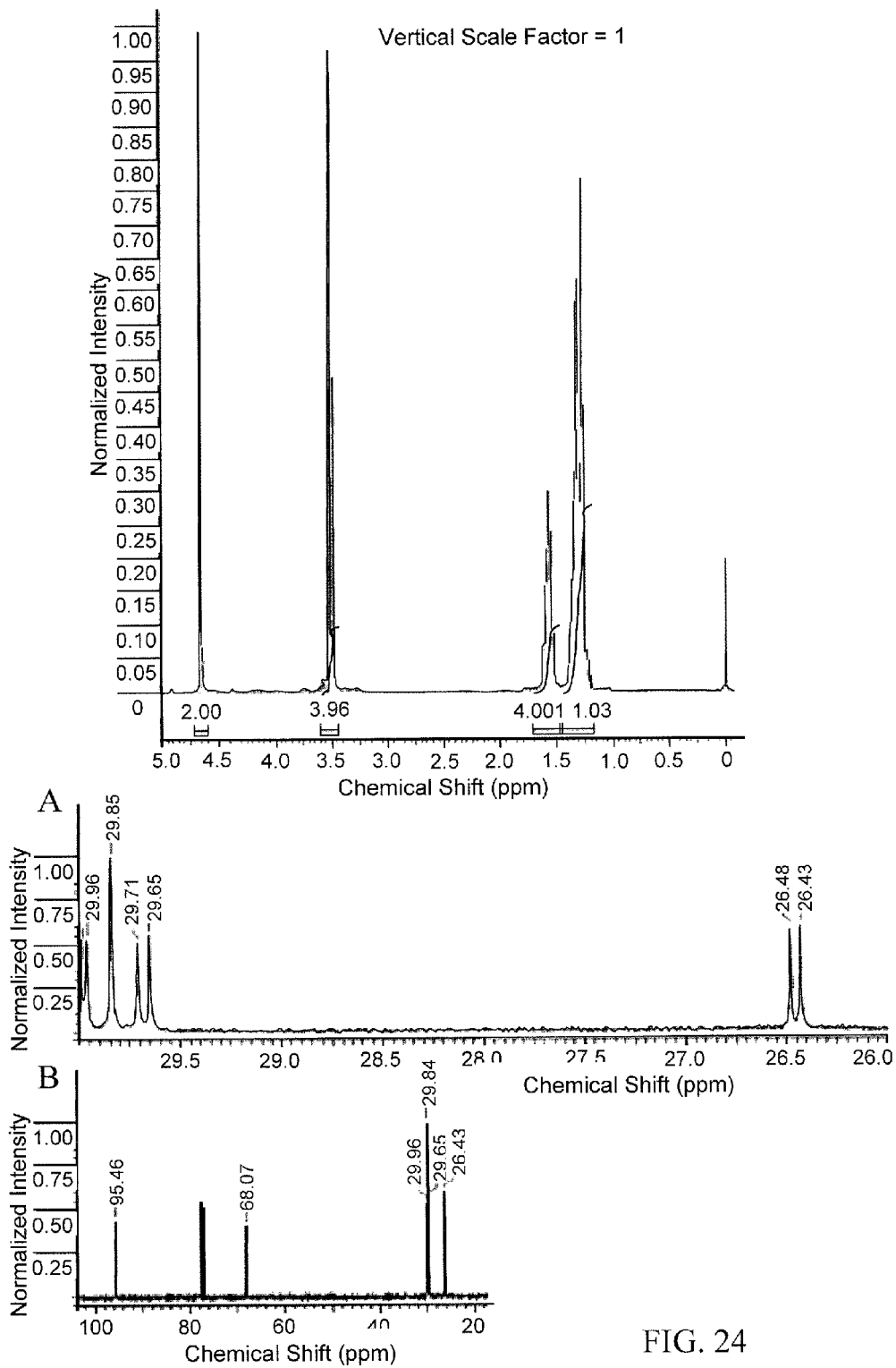
FIG. 24 shows a) $^1$H NMR and b) $^{13}$C spectra for 1:1 poly(octylene acetal-co-dodecylene acetal) according to an embodiment of the invention.

A mixture of 6.25 mmol (914 mg) of 1,8-octanediol and 6.25 mmol (1,256 mg) of 1,12-dodecanediol were combined in a 100 mL pear flask, to which 25 mg (~1 mol %) of p-toluenesulfonic acid monohydrate, 20 mL (160 mmol) of diethoxymethane, and 30 mL of toluene were added. The flask was connected to a distillation column and the mixture was stirred under a nitrogen atmosphere at 80° C. for 30 minutes, and heated until ethanol distilled from the mixture. After a loss of reflux, the temperature was raised to remove diethoxymethane and further increased to remove toluene. The heat was maintained for a period of 12 hours and then placed under vacuum at 125° C. for 24 hours. After cooling to room temperature, removal of the catalyst and isolation of the polyacetal, NMR spectra were acquired, confirming the presence of the acetal functionality in the polyacetal. FIG. 23 shows the DSC plot for the copolymer, and FIG. 24 shows the $^1$H and $^{13}$C NMR spectra for the copolymer.

TABLE 2

Polyacetals prepared from Toluene or Xylene[s]

| diol | Polymer | yield (%) | $M_n$ (g/mol) | PDI | $T_g$ (° C.) | $T_m$ (° C.) |
|---|---|---|---|---|---|---|
| $HO(CH_2)_2OH$ | N/A, forms 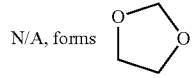 | — | — | — | — | — |
| $HO(CH_2)_3OH$ | N/A, forms 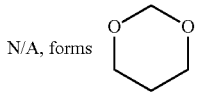 | — | — | — | — | — |
| $HO(CH_2)_4OH$ | 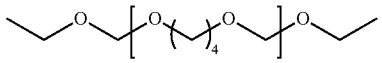 | NR | — | — | — | — |
| $HO(CH_2)_5OH$ | 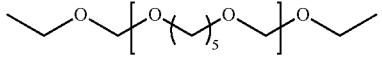 | 19 | 13,800 | 1.43 | nd | 37 |
| $HO(CH_2)_6OH$ | 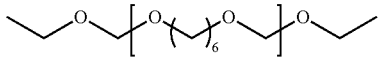 | NR | — | — | — | — |
| $HO(CH_2)_7OH$ | 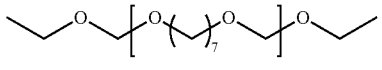 | 87 | 24,300 | 1.85 | nd | nd |
| $HO(CH_2)_8OH$ |  | 87 | 21,300 | 1.92 | nd | 48 |
| $HO(CH_2)_9OH$ |  | 79 | 18,900 | 1.83 | nd | 56 |
| $HO(CH_2)_{10}OH$ | 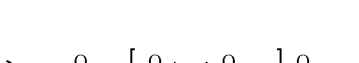 | 96 | 8,100 | 1.64 | nd | 58 |

TABLE 2-continued

Polyacetals prepared from Toluene or Xylene[s]

| diol | Polymer | yield (%) | $M_n$ (g/mol) | PDI | $T_g$ (°C.) | $T_m$ (°C.) |
|---|---|---|---|---|---|---|
| HO(CH$_2$)$_{12}$OH | | 96 | 11,600 | 1.75 | nd | 63 |
| 1:1[a] HO(CH$_2$)$_8$OH:HO(CH$_2$)$_{12}$OH[a] | | 57 | 23,800 | 1.86 | −57 | 34/42 |
| HO(CH$_2$)$_5$OH[b] | | NR | — | — | — | — |
| HO(CH$_2$)$_7$OH[b] | | 91 | 26,700 | 1.85 | −73 | 49 |
| HO(CH$_2$)$_8$OH[b] | | 93 | 27,000 | 1.94 | −71 | 48 |
| HO(CH$_2$)$_9$OH[b] | | 91 | 28,600 | 2.01 | −63 | 56 |
| HO(CH$_2$)$_{10}$OH[b] | | 93 | 27,600 | 1.83 | −57 | 60 |
| HO(CH$_2$)$_{12}$OH[b] | | 94 | 31,200 | 1.82 | −41 | 65 |
| HO(CH$_2$)$_{10}$OH[c] | | 78 | 11,300 | 2.05 | nd | nd |

[a]as per Copolymerization, above,
[b]xylenes substituted for toluene with final strip at 200° C.,
[c]as per Polymerization from the bis-acetal: 2,4,15,17-tetraoxaoctadecane.

Degradation Studies

The degradation of polydecylene acetal (PDA), poly-L-lactide (PLLA), and a sample of polylactide from Nature-Works (PLA-600). PLLA was prepared from L-lactide, where a 250 mL round bottom flask was charged with 14.4 g (100 mmol) of L-lactide, 0.203 g (0.5 mol %) of stannous octoate, 54 mg (0.5 mol %) of benzyl alcohol, and 150 mL of toluene in a glove box. The mixture was stirred under an inert atmosphere at 100° C. for 24 hours. The reaction was cooled and solvents were removed using a rotary evaporator. The crude mixture was dissolved in minimal amounts of methylene chloride and precipitated in 300 mL of acidic methanol. The precipitate was filtered and dried under vacuum to yield the product in 90% yield. A PLA cup from NatureWorks was dissolved in methylene chloride and the polymer was precipitated in cold methanol. The precipitate was filtered and dried to yield PLA-600 as a white powder.

Figure 25:
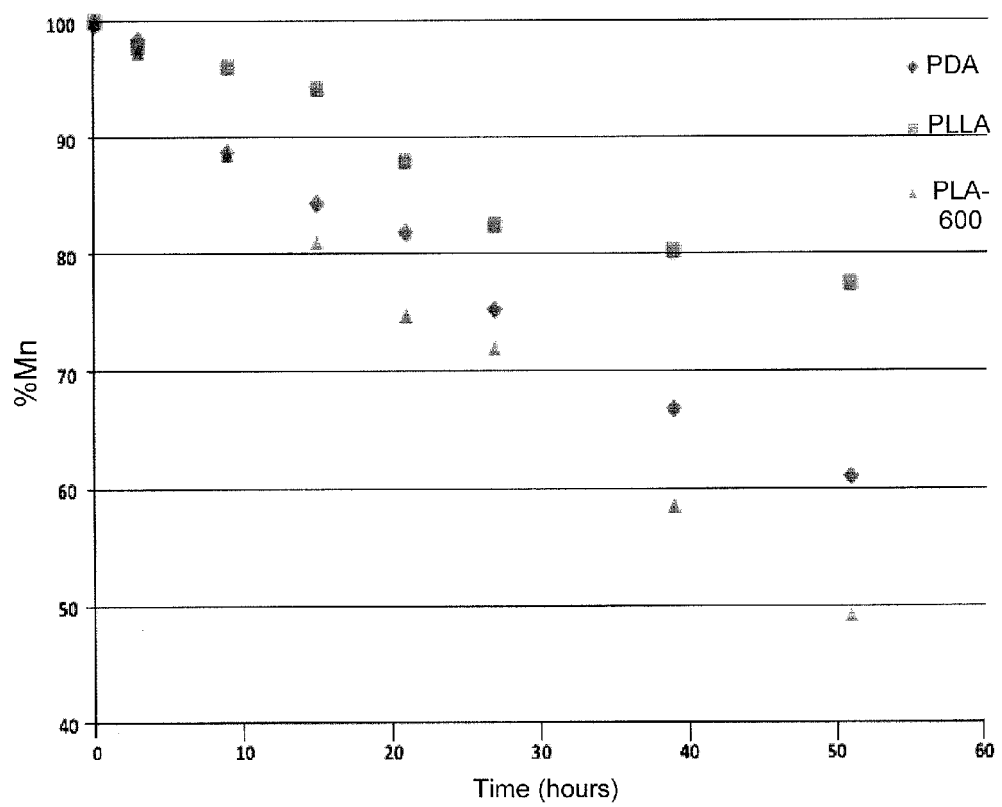
FIG. 25 is a plot of the degradation of polydecylene acetal (PDA), according to an embodiment of the invention, in comparison to the degradation of poly(L-lactide) as synthesized (PLLA) and as commercially available (PLA-600).

Solution phase degradation studies were carried out by dissolving 250 mg of the respective polymers in 100 mL of tetrahydrofuran. To the solution was added 0.5 mL of water and 0.1 mL of sulfuric acid, and the mixture was shaken using an orbital shaker. At regular intervals, 5 mL aliquots were removed and passed through a basic alumina column. The solvent was removed using a rotary evaporator and the residue was analyzed by gel permeation chromatography, to yield the results shown in Table 3, below, and as plotted in FIG. 25.

TABLE 3

GPC Data for Degradation Studies

| # | time (hr) | PDA (g/mol) | PDA (% $M_{ni}$) | PLLA (g/mol) | PLLA (% $M_{ni}$) | PLA-600 (g/mol) | PLA-600 (% $M_{ni}$) |
|---|---|---|---|---|---|---|---|
| 0 | 0 | 30531 | 100 | 38014 | 100 | 95752 | 100 |
| 1 | 3 | 30061 | 98 | 37183 | 98 | 93198 | 97 |
| 2 | 9 | 27067 | 89 | 36524 | 96 | 84863 | 89 |
| 3 | 15 | 25729 | 84 | 35821 | 94 | 77666 | 81 |
| 4 | 21 | 24989 | 82 | 33453 | 88 | 71660 | 75 |
| 5 | 27 | 22990 | 75 | 31359 | 82 | 69000 | 72 |
| 6 | 39 | 20416 | 67 | 30516 | 80 | 56067 | 59 |
| 7 | 51 | 18638 | 61 | 29461 | 78 | 47171 | 49 |

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method of preparing a polyacetal comprising the steps of:
providing a polymerization mixture comprising a plurality of bis-acetal monomers of the structure:

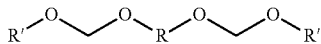

wherein R' is independently $C_1$ to $C_5$ alkyl, R is one or more substituted or unsubstituted: $C_5$ to $C_{24}$ alkylene; $C_4$ to $C_{24}$ alkenylene; $C_6$ to $C_{14}$ arylene; $C_7$ to $C_{24}$ alkylarylene; heteroatom or carbonyl interrupted $C_3$ to $C_{24}$ alkylene; heteroatom or carbonyl interrupted $C_4$ to $C_{24}$ alkenylene; heteroatom or carbonyl interrupted $C_4$ to $C_{14}$ arylene; or heteroatom or carbonyl interrupted $C_5$ to $C_{24}$ alkylarylene; and polymerizing said bis-acetal monomers upon addition of a catalyst to said polymerization mixture to form a polyacetal that is a polymer or copolymer of the structure:

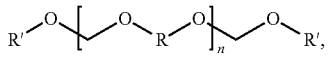

where n is on average greater than 10.

2. The method of claim 1, wherein said bis-acetal monomer is provided in situ by providing a plurality of diols of the structure:

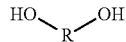

and an acetal of the structure:

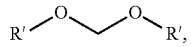

wherein said bis-acetal monomer is formed by alkoxymethylation and the polyacetal is formed without the isolation of a bis-acetal monomer.

3. The method of claim 1, wherein said polymerization mixture further comprises a solvent.

4. The method of claim 1, wherein said catalyst comprises a protonic acid, Lewis acid, metal oxyhalide, or metal sulfate.

5. The method of claim 4, wherein said protonic acid comprises toluene sulfonic acid.

6. The method of claim 1, wherein said polyacetal is a copolymer of two or more acetal repeating units.

7. The method of claim 1, further comprising an end-capping unit comprising at least one functionality for polymerization that is unreactive with an acetal functionality and one acetal functionality of the structure:

$R'_xOCH_2O$— where R' is $C_1$ to $C_5$ alkyl.

8. The method of claim 1, further comprising a non-acetal polymer comprising one or more acetal functionality and one acetal functionality of the structure:

$R'_xOCH_2O$— where R' is $C_1$ to $C_5$ alkyl, wherein the non-acetal polymer comprises a block of a block copolymer with the polyacetal being a second block.

9. A polyacetal comprising the structure:

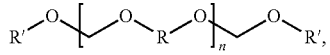

wherein R' is independently $C_1$ to $C_5$ alkyl, n is on average greater than 10, and R is one or more linear, branched or cyclic: $C_5$ to $C_{24}$ alkylene; $C_4$ to $C_{24}$ alkenylene; $C_6$ to $C_{14}$ arylene; $C_7$ to $C_{24}$ alkylarylene; heteroatom or carbonyl interrupted $C_4$ to $C_{24}$ alkylene where the heteroatom is O or S; heteroatom or carbonyl interrupted $C_4$ to $C_{24}$ alkenylene where the heteroatom is O or S; heteroatom or carbonyl interrupted $C_4$ to $C_{14}$ arylene where the heteroatom is O or S; and/or heteroatom or carbonyl interrupted $C_5$ to $C_{24}$ alkylarylene where the heteroatom is O or S.

10. The polyacetal of claim 9, wherein the R groups are selected from linear $C_5$ to $C_{24}$ alkylenes.

11. The polyacetal of claim 9, further comprising an end-capping unit comprising a functionality for polymerization that is unreactive with an acetal functionality.

12. The polyacetal of claim 9, further comprising an end-capping unit comprising at least one functionality for polymerization that is unreactive with an acetal functionality.

13. The polyacetal of claim 9, further comprising a block of a non-acetal polymer.

* * * * *